US012676706B2

(12) United States Patent
Liu

(10) Patent No.: US 12,676,706 B2
(45) Date of Patent: Jul. 7, 2026

(54) METHOD AND DEVICE IN NODES USED FOR WIRELESS COMMUNICATION

(71) Applicant: Zheng Liu, Shanghai (CN)

(72) Inventor: Zheng Liu, Shanghai (CN)

(73) Assignee: SHANGHAI TUILUO COMMUNICATION TECHNOLOGY PARTNERSHIP (LIMITED PARTNERSHIP), Shanghai (CN)

( * ) Notice: Subject to any disclaimer, the term of this patent is extended or adjusted under 35 U.S.C. 154(b) by 356 days.

(21) Appl. No.: 18/225,695

(22) Filed: Jul. 25, 2023

(65) Prior Publication Data

US 2023/0370215 A1 Nov. 16, 2023

Related U.S. Application Data

(63) Continuation of application No. PCT/CN2022/076867, filed on Feb. 18, 2022.

(30) Foreign Application Priority Data

Feb. 20, 2021 (CN) ......................... 202110190875.2
Dec. 29, 2021 (CN) ......................... 202111639262.9

(51) Int. Cl.
*H04L 5/00* (2006.01)
*H04W 72/0446* (2023.01)
(Continued)

(52) U.S. Cl.
CPC ....... *H04L 5/0012* (2013.01); *H04W 72/0446* (2013.01); *H04W 72/0453* (2013.01); *H04W 72/23* (2023.01)

(58) Field of Classification Search
CPC ..................................................... H04L 5/0012
See application file for complete search history.

(56) References Cited

U.S. PATENT DOCUMENTS

2013/0163535 A1 6/2013 Anderson et al.
2017/0086219 A1 3/2017 Lee et al.
(Continued)

FOREIGN PATENT DOCUMENTS

CN 102460991 A 5/2012
CN 102934404 A 2/2013
CN 103119886 A 5/2013
CN 106797641 A 5/2017
CN 107027181 A 8/2017
(Continued)

OTHER PUBLICATIONS

ISR received in application No. PCT/CN2022/076867 dated May 23, 2022.

*Primary Examiner* — Jason E Mattis

(57) ABSTRACT

The present application discloses a method and a device in a node for wireless communications. A node receives a first PDCCH; and transmits a first PUCCH, the first PUCCH occupying X1 multicarrier symbols in time domain; a first basic sequence generates the first PUCCH, and the first basic sequence generates X2 sequences; a target multicarrier symbol is one of the X1 multicarrier symbols, and a target RE set comprises multiple REs, any RE comprised by the target RE set occupying the target multicarrier symbol in time domain; a target sequence is one of the X2 sequences, and a target parameter is used to determine a cyclic shift of the target sequence, the target sequence generating a complex-valued symbol mapped onto the target RE set; the target parameter is one of X3 candidate parameters. The present application enhances the HARQ feedback transmission performance.

20 Claims, 5 Drawing Sheets

(51) Int. Cl.

| | |
|---|---|
| ***H04W 72/0453*** | (2023.01) |
| ***H04W 72/23*** | (2023.01) |

(56) References Cited

U.S. PATENT DOCUMENTS

| | | | | |
|---|---|---|---|---|
| 2018/0270803 | A1* | 9/2018 | Kwak | H04W 74/08 |
| 2019/0074888 | A1* | 3/2019 | Wu | H04B 17/102 |
| 2020/0045691 | A1 | 2/2020 | Park et al. | |
| 2022/0368471 | A1* | 11/2022 | Lin | H04L 1/1854 |
| 2023/0231662 | A1* | 7/2023 | Gou | H04L 1/1896 370/329 |
| 2023/0269706 | A1* | 8/2023 | Yoshioka | H04W 4/40 |
| 2024/0048330 | A1* | 2/2024 | Li | H04W 72/20 |

FOREIGN PATENT DOCUMENTS

| | | | |
|---|---|---|---|
| CN | 107852318 | A | 3/2018 |
| CN | 108432312 | A | 8/2018 |
| CN | 109474402 | A | 3/2019 |
| CN | 109565429 | A | 4/2019 |
| CN | 110392997 | A | 10/2019 |
| CN | 110637430 | A | 12/2019 |
| CN | 111052658 | A | 4/2020 |
| CN | 111344983 | A | 6/2020 |
| CN | 111567117 | A | 8/2020 |
| WO | 2020153721 | A1 | 7/2020 |
| WO | 2020226406 | A1 | 11/2020 |
| WO | 2020252469 | A1 | 12/2020 |
| WO | 2021020955 | A1 | 2/2021 |

* cited by examiner

METHOD AND DEVICE IN NODES USED FOR WIRELESS COMMUNICATION

CROSS REFERENCE TO RELATED APPLICATIONS

This application is a continuation of the international patent application No. PCT/CN2022/076867, filed on Feb. 18, 2022, and claims the priority benefit of Chinese Patent Application No. 202111639262.9, filed on Dec. 29, 2021, and claims the priority benefit of Chinese Patent Application No. 202110190875.2, filed on Feb. 20, 2021, the full disclosure of which is incorporated herein by reference.

BACKGROUND

Technical Field

The present application relates to transmission methods and devices in wireless communication systems, and in particular to a scheme and device for groupcast, multicast or broadcast transmissions in wireless communications.

RELATED ART

Application scenarios of future wireless communication systems are becoming increasingly diversified, and different application scenarios have different performance demands on systems. In order to meet different performance requirements of various application scenarios, the 3rd Generation Partner Project (3GPP) Radio Access Network (RAN) #72 plenary decided to conduct the study of New Radio (NR), or what is called fifth Generation (5G). The work Item (WI) of NR was approved at the 3GPP RAN #75 session to standardize the NR. A decision was made at the 3GPP RAN #86 Plenary on starting a Study Item (SI) and Work Item (WI) of NR Rel-17.

In a wide range of application scenarios where NR technology is adopted, for instance, in firmware updating and video broadcasting, both Multicast and Broadcast traffics transmissions shall be supported. In NR Rel-17, to support multicast and broadcast services, a WI of NR-backed multicast and broadcast traffics was approved by the 3GPP RAN #86 Plenary to start work of standardization.

SUMMARY

In the WI of multicast and broadcast transmissions the HARQ feedback is supported to enhance the robustness of multicast/broadcast transmissions. To address the issue of HARQ feedback in multicast/broadcast transmission, the present application provides a solution. It should be noted that the statement in the present application only takes multicast/broadcast transmission as a typical application scenario or example; The present application also applies to other scenarios confronting similar difficulties, for instance, a scenario where various services co-exist, or a scenario where multiple parallel downlink transmissions for a same UE co-exist in a serving cell, where similar technical effects can be achieved. Additionally, the adoption of a unified solution for various scenarios, including but not limited to multicast/broadcast transmission scenarios, contributes to the reduction of hardcore complexity and costs. In the case of no conflict, the embodiments of a first node and the characteristics in the embodiments may be applied to a second node, and vice versa. Particularly, for interpretations of the terminology, nouns, functions and variables (unless otherwise specified) in the present application, refer to definitions given in TS36 series, TS38 series and TS37 series of 3GPP specifications.

The present application provides a method in a first node for wireless communications, comprising:

receiving a first PDCCH; and transmitting a first PUCCH, the first PUCCH occupying X1 multicarrier symbols in time domain, and the first PDCCH being used to determine a starting multicarrier symbol among the X1 multicarrier symbols, where X1 is a positive integer greater than 1;

herein, a first basic sequence is used for generating the first PUCCH, and X2 sequences are generated by the first basic sequence through cyclic shifts, any two sequences among the X2 sequences are different, where X2 is a positive integer greater than 1; a target multicarrier symbol is one of the X1 multicarrier symbols, and a target Resource Element (RE) set comprises multiple REs occupied by the first PUCCH, any RE comprised by the target RE set occupying the target multicarrier symbol in time domain; a target sequence is one of the X2 sequences, and a target parameter is used to determine a cyclic shift of the target sequence, the target sequence being used for generating a complex-valued symbol mapped onto the target RE set; the target parameter is one of X3 candidate parameters, and any candidate parameter among the X3 candidate parameters is a non-negative integer smaller than a length of the first basic sequence, X3 being a positive integer greater than 1; there are two candidate parameters among the X3 candidate parameters between which a difference is no smaller than half the length of the first basic sequence, and any candidate parameter among the X3 candidate parameters is used to determine a cyclic shift of at least one sequence among the X2 sequences; a time-domain position of the target multicarrier symbol is used to determine the target parameter out of the X3 candidate parameters.

In one embodiment, by determining a target parameter based on a position of a target multicarrier symbol, various cyclic shifts will be supported to be used on different OFDM symbols to carry NACK feedback information, which not only increases the diversity gains but also enhances the robustness of NACK feedback information transmission.

In one embodiment, it is required that a difference between two candidate parameters shall be no smaller than half the length of a first basic sequence, so as to lengthen the distance(s) between two or more values of a cyclic shift that carries NACK feedback information, hence a lower chance of missed detection and further enhancements of the diversity gains and the performance of NACK feedback transmission.

According to one aspect of the present application, the above method is characterized in comprising:

receiving a first PDSCH;

herein, the first PDSCH carries a first bit block, the first bit block comprising at least one bit, the first PUCCH being used to indicate that the first bit block is incorrectly decoded.

According to one aspect of the present application, the above method is characterized in that a first parameter is used to determine a cyclic shift of the target sequence, and a pseudo-random sequence is used to determine the first parameter, the first parameter being a non-negative integer; a target identifier is used to determine an initial value of a generator of the pseudo-random sequence; the target identifier is configurable, or the target identifier is pre-defined.

According to one aspect of the present application, the above method is characterized in comprising:

receiving a first information block;

herein, the first information block is used to determine the X1 multicarrier symbols, and the first information block is used to determine whether the first PUCCH uses frequency hopping; when the first PUCCH uses frequency hopping, a frequency-hopping range to which the target multicarrier symbol belongs is used to determine the target parameter out of the X3 candidate parameters; otherwise, a position of the target multicarrier symbol among the X1 multicarrier symbols is used to determine the target parameter out of the X3 candidate parameters.

In one embodiment, values of a cyclic shift carrying NACK feedback information are combined with a frequency-hopping range in which the cyclic shift is comprised to reach a balance between combined gains and diversity gains, thus maximizing the transmission performance of NACK feedback information.

According to one aspect of the present application, the above method is characterized in that a second parameter is used to determine a cyclic shift of the target sequence, the second parameter being a non-negative integer; at least one of a first identifier or a first measurement value is used to determine the second parameter, where the first identifier is an identifier that the first node is configured with, and the first measurement value is a measurement value obtained from a measurement by the first node.

In one embodiment, by determining a second parameter according to at least one of a first identifier or a first measurement value, UEs that belong to different UE groups can be supported to use various cyclic shifts for respective feedbacks of NACK information, which in turn enables the base station to determine retransmission strategies based on feedback situations of different UE groups, thus increasing the resource utilization ratio in NACK feedback information transmission and data retransmission.

According to one aspect of the present application, the above method is characterized in that X4 modulation symbols are used for generating the first PUCCH, modulation schemes used by any two modulation symbols among the X4 modulation symbols are identical, and phases of any two modulation symbols among the X4 modulation symbols are different, where X4 is a positive integer greater than 1; a first Resource Element (RE) is an RE occupied by the first PUCCH, and a target modulation symbol is used for generating a complex-valued symbol mapped onto the first RE, the target modulation symbol being one of the X4 modulation symbols, where a time-domain position of a multicarrier symbol occupied by the first RE in time domain is used to determine the target modulation symbol.

In one embodiment, while supporting the cyclic shift in changing with positions of multicarrier symbols, support is also provided such that phases of modulation symbols can change with the positions of multicarrier symbols, too. In this way Euclidean distance for modulation can be maximized, and the diversity gains can be further enhanced, and the transmission performance of NACK feedback information can be optimized.

According to one aspect of the present application, the above method is characterized in that the X3 candidate parameters are sorted in an ascending order, and a difference between any two adjacent candidate parameters among the X3 candidate parameters is equal to a first difference, where a length of the first basic sequence is used together with X3 to determine the first difference.

The present application provides a method in a second node for wireless communications, comprising:

transmitting a first PDCCH; and receiving a first PUCCH, the first PUCCH occupying X1 multicarrier symbols in time domain, and the first PDCCH being used to indicate a starting multicarrier symbol among the X1 multicarrier symbols, where X1 is a positive integer greater than 1;

herein, a first basic sequence is used for generating the first PUCCH, and X2 sequences are generated by the first basic sequence through cyclic shifts, any two sequences among the X2 sequences are different, where X2 is a positive integer greater than 1; a target multicarrier symbol is one of the X1 multicarrier symbols, and a target Resource Element (RE) set comprises multiple REs occupied by the first PUCCH, any RE comprised by the target RE set occupying the target multicarrier symbol in time domain; a target sequence is one of the X2 sequences, and a target parameter is used to determine a cyclic shift of the target sequence, the target sequence being used for generating a complex-valued symbol mapped onto the target RE set; the target parameter is one of X3 candidate parameters, and any candidate parameter among the X3 candidate parameters is a non-negative integer smaller than a length of the first basic sequence, X3 being a positive integer greater than 1; there are two candidate parameters among the X3 candidate parameters between which a difference is no smaller than half the length of the first basic sequence, and any candidate parameter among the X3 candidate parameters is used to determine a cyclic shift of at least one sequence among the X2 sequences; a time-domain position of the target multicarrier symbol is used to determine the target parameter out of the X3 candidate parameters.

According to one aspect of the present application, the above method is characterized in comprising:

transmitting a first PDSCH;

herein, the first PDSCH carries a first bit block, the first bit block comprising at least one bit, the first PUCCH being used to indicate that the first bit block is incorrectly decoded.

According to one aspect of the present application, the above method is characterized in that a first parameter is used to determine a cyclic shift of the target sequence, and a pseudo-random sequence is used to determine the first parameter, the first parameter being a non-negative integer; a target identifier is used to determine an initial value of a generator of the pseudo-random sequence; the target identifier is configurable, or the target identifier is pre-defined.

According to one aspect of the present application, the above method is characterized in comprising:

transmitting a first information block;

herein, the first information block is used to indicate the X1 multicarrier symbols, and the first information block is used to indicate whether the first PUCCH uses frequency hopping; when the first PUCCH uses frequency hopping, a frequency-hopping range to which the target multicarrier symbol belongs is used to determine the target parameter out of the X3 candidate parameters; otherwise, a position of the target multicarrier symbol among the X1 multicarrier symbols is used to determine the target parameter out of the X3 candidate parameters.

According to one aspect of the present application, the above method is characterized in that a second parameter is used to determine a cyclic shift of the target sequence, the second parameter being a non-negative integer; at least one of a first identifier or a first measurement value is used to determine the second parameter, where the first identifier is an identifier that a transmitter of the first PUCCH is configured with, and the first measurement value is a measurement value obtained from a measurement by the transmitter of the first PUCCH.

According to one aspect of the present application, the above method is characterized in that X4 modulation symbols are used for generating the first PUCCH, modulation schemes used by any two modulation symbols among the X4 modulation symbols are identical, and phases of any two modulation symbols among the X4 modulation symbols are different, where X4 is a positive integer greater than 1; a first Resource Element (RE) is an RE occupied by the first PUCCH, and a target modulation symbol is used for generating a complex-valued symbol mapped onto the first RE, the target modulation symbol being one of the X4 modulation symbols, where a time-domain position of a multicarrier symbol occupied by the first RE in time domain is used to determine the target modulation symbol.

According to one aspect of the present application, the above method is characterized in that the X3 candidate parameters are sorted in an ascending order, and a difference between any two adjacent candidate parameters among the X3 candidate parameters is equal to a first difference, where a length of the first basic sequence is used together with X3 to determine the first difference.

The present application provides a first node for wireless communications, comprising:

a first receiver, receiving a first PDCCH; and a first transmitter, transmitting a first PUCCH, the first PUCCH occupying X1 multicarrier symbols in time domain, and the first PDCCH being used to determine a starting multicarrier symbol among the X1 multicarrier symbols, where X1 is a positive integer greater than 1;

herein, a first basic sequence is used for generating the first PUCCH, and X2 sequences are generated by the first basic sequence through cyclic shifts, any two sequences among the X2 sequences are different, where X2 is a positive integer greater than 1; a target multicarrier symbol is one of the X1 multicarrier symbols, and a target Resource Element (RE) set comprises multiple REs occupied by the first PUCCH, any RE comprised by the target RE set occupying the target multicarrier symbol in time domain; a target sequence is one of the X2 sequences, and a target parameter is used to determine a cyclic shift of the target sequence, the target sequence being used for generating a complex-valued symbol mapped onto the target RE set; the target parameter is one of X3 candidate parameters, and any candidate parameter among the X3 candidate parameters is a non-negative integer smaller than a length of the first basic sequence, X3 being a positive integer greater than 1; there are two candidate parameters among the X3 candidate parameters between which a difference is no smaller than half the length of the first basic sequence, and any candidate parameter among the X3 candidate parameters is used to determine a cyclic shift of at least one sequence among the X2 sequences; a time-domain position of the target multicarrier symbol is used to determine the target parameter out of the X3 candidate parameters.

The present application provides a second node for wireless communications, comprising:

a second transmitter, transmitting a first PDCCH; and a second receiver, receiving a first PUCCH, the first PUCCH occupying X1 multicarrier symbols in time domain, and the first PDCCH being used to indicate a starting multicarrier symbol among the X1 multicarrier symbols, where X1 is a positive integer greater than 1;

herein, a first basic sequence is used for generating the first PUCCH, and X2 sequences are generated by the first basic sequence through cyclic shifts, any two sequences among the X2 sequences are different, where X2 is a positive integer greater than 1; a target multicarrier symbol is one of the X1 multicarrier symbols, and a target Resource Element (RE) set comprises multiple REs occupied by the first PUCCH, any RE comprised by the target RE set occupying the target multicarrier symbol in time domain; a target sequence is one of the X2 sequences, and a target parameter is used to determine a cyclic shift of the target sequence, the target sequence being used for generating a complex-valued symbol mapped onto the target RE set; the target parameter is one of X3 candidate parameters, and any candidate parameter among the X3 candidate parameters is a non-negative integer smaller than a length of the first basic sequence, X3 being a positive integer greater than 1; there are two candidate parameters among the X3 candidate parameters between which a difference is no smaller than half the length of the first basic sequence, and any candidate parameter among the X3 candidate parameters is used to determine a cyclic shift of at least one sequence among the X2 sequences; a time-domain position of the target multicarrier symbol is used to determine the target parameter out of the X3 candidate parameters.

In one embodiment, the method in the present application has the following advantages:

the method in the present application supports different cyclic shifts to be adopted on different OFDM symbols to carry NACK feedback information, which not only increases the diversity gains but also enhances the robustness of NACK feedback information transmission;

the method in the present application is used to lengthen the distance(s) between two or more values of a cyclic shift that carries NACK feedback information, hence a lower chance of missed detection and further enhancements of the diversity gains and the performance of NACK feedback transmission;

the method in the present application combines values of a cyclic shift carrying NACK feedback information with a frequency-hopping range in which the cyclic shift is comprised to reach a balance between combined gains and diversity gains, thus maximizing the transmission performance of NACK feedback information;

in the method provided in the present application, UEs that belong to different UE groups can be supported to use various cyclic shifts for respective feedbacks of NACK information, which in turn enables the base station to determine retransmission schemes based on feedback situations of different UE groups, thus increasing the resource utilization ratio in NACK feedback information transmission and data retransmission;

the method in the present application, while supporting the cyclic shift in changing with positions of multicarrier symbols, also provides support such that phases of modulation symbols can change with the positions of multicarrier symbols, too. In this way Euclidean distance for modulation can be maximized, and the diversity gains can be further enhanced, and the transmission performance of NACK feedback information can be optimized.

BRIEF DESCRIPTION OF THE DRAWINGS

Other features, objects and advantages of the present application will become more apparent from the detailed description of non-restrictive embodiments taken in conjunction with the following drawings.

DESCRIPTION OF THE EMBODIMENTS

The technical scheme of the present application is described below in further details in conjunction with the drawings. It should be noted that the embodiments of the present application and the characteristics of the embodiments may be arbitrarily combined if no conflict is caused.

Embodiment 1

Figure 1:
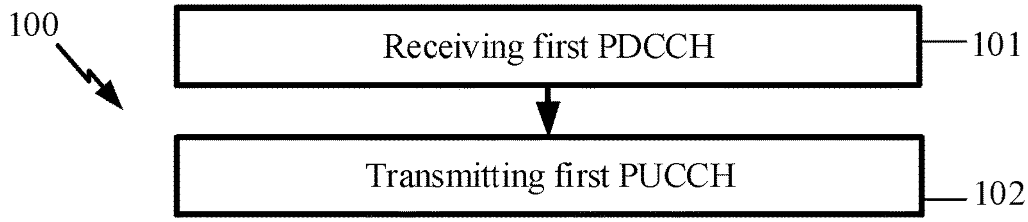
FIG. 1 illustrates a flowchart of a first PDCCH and a first PUCCH according to one embodiment of the present application.

Embodiment 1 illustrates a flowchart 100 of a first PDCCH and a first PUCCH according to one embodiment of the present application, as shown in FIG. 1. In FIG. 1, each step represents a step, it should be particularly noted that the sequence order of each box herein does not imply a chronological order of steps marked respectively by these boxes.

In Embodiment 1, the first node in the present application receives a first PDCCH in step 101, and transmits a first PUCCH in step 102, the first PUCCH occupying X1 multicarrier symbols in time domain, while the first PDCCH being used to determine a starting multicarrier symbol among the X1 multicarrier symbols, where X1 is a positive integer greater than 1; herein, a first basic sequence is used for generating the first PUCCH, and X2 sequences are generated by the first basic sequence through cyclic shifts, any two sequences among the X2 sequences are different, where X2 is a positive integer greater than 1; a target multicarrier symbol is one of the X1 multicarrier symbols, and a target Resource Element (RE) set comprises multiple REs occupied by the first PUCCH, any RE comprised by the target RE set occupying the target multicarrier symbol in time domain; a target sequence is one of the X2 sequences, and a target parameter is used to determine a cyclic shift of the target sequence, the target sequence being used for generating a complex-valued symbol mapped onto the target RE set; the target parameter is one of X3 candidate parameters, and any candidate parameter among the X3 candidate parameters is a non-negative integer smaller than a length of the first basic sequence, X3 being a positive integer greater than 1; there are two candidate parameters among the X3 candidate parameters between which a difference is no smaller than half the length of the first basic sequence, and any candidate parameter among the X3 candidate parameters is used to determine a cyclic shift of at least one sequence among the X2 sequences; a time-domain position of the target multicarrier symbol is used to determine the target parameter out of the X3 candidate parameters.

In one embodiment, the first PDCCH comprises a radio frequency signal in a Physical Downlink Control Channel (PDCCH).

In one embodiment, the first PDCCH comprises a baseband signal in a PDCCH.

In one embodiment, the first PDCCH is transmitted via a wireless interface.

In one embodiment, the first PDCCH carries Downlink Control Information (DCI).

In one embodiment, a DCI-format DCI Payload is used for generating the first PDCCH.

In one embodiment, the first PDCCH occupies a PDCCH Candidate.

In one embodiment, the first PDCCH occupies a positive integer number of Control Channel Element(s) (CCE(s)).

In one embodiment, the number of CCE(s) occupied by the first PDCCH is equal to one of 1, 2, 4, 8 or 16.

In one embodiment, the first PDCCH is a PDCCH scheduling a Physical Downlink Shared Channel (PDSCH), or the first PDCCH is a PDCCH used for a Semi-Persistent Scheduling (SPS) PDSCH Release.

In one embodiment, the first PDCCH is a PDCCH scheduling a Unicast PDSCH.

In one embodiment, the first PDCCH is a PDCCH scheduling a multicast or broadcast.

In one embodiment, the first PDCCH is a PDCCH scheduling a multicast or broadcast PDSCH.

In one embodiment, the first PDCCH is a PDCCH scheduling a PDSCH, where an RNTI other than a Cell-Radio Network Temporary Identifier (C-RNTI) is used to initialize a scrambling generator for a PDSCH scheduled by the first PDCCH.

In one embodiment, CRC of the first PDCCH is scrambled by a C-RNTI.

In one embodiment, CRC of the first PDCCH is scrambled by an RNTI other than a C-RNTI.

In one embodiment, the first PUCCH comprises a radio frequency signal in a Physical Uplink Control Channel (PUCCH).

In one embodiment, the first PUCCH comprises a baseband signal in a PUCCH.

In one embodiment, the first PUCCH carries Uplink control information (UCI).

In one embodiment, a UCI Format UCI Payload is used for generating the first PUCCH.

In one embodiment, the first PUCCH uses a PUCCH Format 0.

In one embodiment, the first PUCCH uses a PUCCH Format 1.

In one embodiment, the first PUCCH uses a PUCCH Format 2.

In one embodiment, the first PUCCH uses a PUCCH Format 3 or 4.

In one embodiment, the first PUCCH only occupies one Physical Resource Block (PRB) in frequency domain.

In one embodiment, the first PUCCH occupies more than one Physical Resource Block (PRB) in frequency domain.

In one embodiment, the first PUCCH only occupies one Physical Resource Block (PRB)within a multicarrier symbol in frequency domain.

In one embodiment, a time-frequency resource occupied by the first PUCCH is shared by multiple UEs.

In one embodiment, a time-frequency resource occupied by the first PUCCH is only used by the first node in the present application.

In one embodiment, the first PUCCH only carries a Negative Acknowledgement (NACK).

In one embodiment, whether or not the first PUCCH is transmitted respectively indicates a NACK or an ACK.

In one embodiment, the first PUCCH being transmitted is used to indicate a NACK, and the first PUCCH not being transmitted is used to indicate an ACK.

In one embodiment, the first PUCCH only occupies the X1 multicarrier symbols in time domain.

In one embodiment, the first PUCCH also occupies one or more multicarrier symbols other than the X1 multicarrier symbols in time domain.

In one embodiment, X1 is equal to 2.

In one embodiment, X1 is equal to one of positive integers from 4 to 14.

In one embodiment, any of the X1 multicarrier symbols is an Orthogonal Frequency Division Multiplexing (OFDM) Symbol.

In one embodiment, any of the X1 multicarrier symbols is a Single Carrier-Frequency Division Multiple Access (SC-FDMA) symbol.

In one embodiment, any of the X1 multicarrier symbols is a time-domain symbol.

In one embodiment, any of the X1 multicarrier symbols comprises a Cyclic Prefix (CP) and data part.

In one embodiment, the X1 multicarrier symbols are contiguous in time domain.

In one embodiment, the X1 multicarrier symbols are discrete in time domain.

In one embodiment, any two of the X1 multicarrier symbols are orthogonal.

In one embodiment, a starting multicarrier symbol among the X1 multicarrier symbols is a multicarrier symbol that is earliest in time domain among the X1 multicarrier symbols.

In one embodiment, a starting multicarrier symbol among the X1 multicarrier symbols is a multicarrier symbol with a smallest index among the X1 multicarrier symbols.

In one embodiment, any two of the X1 multicarrier symbols belong to a same slot.

In one embodiment, there are two multicarrier symbols among the X1 multicarrier symbols that belong to different slots.

In one embodiment, the statement in the claims that "the first PDCCH being used to determine a starting multicarrier symbol among the X1 multicarrier symbols" includes the following meaning: the first PDCCH is used by the first node in the present application to determine a starting multicarrier symbol among the X1 multicarrier symbols.

In one embodiment, the statement in the claims that "the first PDCCH being used to determine a starting multicarrier symbol among the X1 multicarrier symbols" includes the following meaning: the first PDCCH is used for explicitly or implicitly indicating a starting multicarrier symbol among the X1 multicarrier symbols.

In one embodiment, the statement in the claims that "the first PDCCH being used to determine a starting multicarrier symbol among the X1 multicarrier symbols" includes the following meaning: the first PDCCH is used for indicating a time interval or a number of multicarrier symbol(s) comprised between an ending multicarrier symbol occupied by the first PDSCH in the present application and a starting multicarrier symbol among the X1 multicarrier symbols.

In one embodiment, the statement in the claims that "the first PDCCH being used to determine a starting multicarrier symbol among the X1 multicarrier symbols" includes the following meaning: the first PDCCH is used for indicating a time interval or a number of slot(s) comprised between a slot to which an ending multicarrier symbol occupied by the first PDSCH in the present application belongs and a slot to which a starting multicarrier symbol among the X1 multicarrier symbols belongs.

In one embodiment, the statement in the claims that "the first PDCCH being used to determine a starting multicarrier symbol among the X1 multicarrier symbols" includes the following meaning: the first PDCCH is used for indicating a number of slot(s) comprised between a slot to which an ending multicarrier symbol occupied by the first PDSCH in the present application belongs and a slot to which a starting multicarrier symbol among the X1 multicarrier symbols belongs; the first information block in the present application is used for indicating a time-domain position of a starting multicarrier symbol of the X1 multicarrier symbols in a slot to which the starting multicarrier symbol belongs.

In one embodiment, the statement in the claims that "the first PDCCH being used to determine a starting multicarrier symbol among the X1 multicarrier symbols" includes the following meaning: the first PDCCH is used to determine a time-domain position of a starting multicarrier symbol of the X1 multicarrier symbols.

In one embodiment, the statement in the claims that "the first PDCCH being used to determine a starting multicarrier symbol among the X1 multicarrier symbols" includes the following meaning: the first PDCCH is used to determine a time-domain position of a slot to which a starting multicarrier symbol of the X1 multicarrier symbols belongs.

In one embodiment, the statement in the claims that "the first PDCCH being used to determine a starting multicarrier symbol among the X1 multicarrier symbols" includes the following meaning: the first PDCCH is used for indicating a reference slot, the first PDCCH indicating a number of slot(s) comprised between a slot to which a starting multicarrier symbol among the X1 multicarrier symbols belongs and the reference slot.

In one embodiment, the first basic sequence is a Zadoff-Chu(ZC) sequence.

In one embodiment, the first basic sequence is a Computer Generated Sequence (CGS).

In one embodiment, the first basic sequence is a low Peak to Average Power Ratio (PAPR) sequence.

In one embodiment, the first basic sequence is a Constant Amplitude Zero Auto Correlation (CAZAC) sequence.

In one embodiment, the first basic sequence is a pseudo-random sequence.

In one embodiment, the first basic sequence is pre-defined.

In one embodiment, the first basic sequence is fixed.

In one embodiment, the first basic sequence is configurable.

In one embodiment, the first basic sequence comprises more than one element.

In one embodiment, a length of the first basic sequence is a number of elements comprised in the first basic sequence.

In one embodiment, any element comprised in the first basic sequence is a complex number of modulus equal to 1.

In one embodiment, any element comprised in the first basic sequence is either 0 or 1.

In one embodiment, a length of the first basic sequence is equal to 12.

In one embodiment, a length of the first basic sequence is a positive integral multiple of 6.

In one embodiment, the statement in the claims that "a first basic sequence is used for generating the first PUCCH" includes the following meaning: the first basic sequence is used for generating the X2 sequences, and the X2 sequences are used for generating the first PUCCH.

In one embodiment, the statement in the claims that "a first basic sequence is used for generating the first PUCCH" includes the following meaning: the X2 sequences are mapped onto physical resources occupied by the first PUCCH for generating the first PUCCH.

In one embodiment, the statement in the claims that "a first basic sequence is used for generating the first PUCCH" includes the following meaning: the first PUCCH is obtained by the X2 sequences being mapped onto physical resources occupied by the first PUCCH, and then through OFDM Baseband Signal Generation.

In one embodiment, the statement in the claims that "a first basic sequence is used for generating the first PUCCH" includes the following meaning: the first PUCCH is obtained by the X2 sequences being mapped onto physical resources occupied by the first PUCCH, and then through OFDM Baseband Signal Generation and Modulation and Upconversion.

In one embodiment, the statement in the claims that "a first basic sequence is used for generating the first PUCCH" includes the following meaning: the first PUCCH is obtained by the X2 sequences being sequentially through Sequence Modulation, Mapping to Physical Resources and OFDM Baseband Signal Generation.

In one embodiment, the statement in the claims that "a first basic sequence is used for generating the first PUCCH" includes the following meaning: the first PUCCH is obtained by the X2 sequences being sequentially through Sequence Modulation, Mapping to Physical Resources, OFDM Baseband Signal Generation and Modulation and Upconversion.

In one embodiment, the statement in the claims that "a first basic sequence is used for generating the first PUCCH" includes the following meaning: the X2 sequences after being through Sequence Modulation are used for generating the first PUCCH.

In one embodiment, the first basic sequence is respectively through X2 mutually different Cyclic Shifts for generating the X2 sequences.

In one embodiment, any sequence among the X2 sequences is generated by the first basic sequence through a cyclic shift.

In one embodiment, a length of any sequence among the X2 sequences is equal to a length of the first basic sequence.

In one embodiment, any sequence among the X2 sequences is generated by the first basic sequence through Phase Rotation.

In one embodiment, cyclic shifts that any two sequences among the X2 sequences respectively go through are of unequal values.

In one embodiment, any two sequences among the X2 sequences comprise different elements.

In one embodiment, elements comprised in any two sequences among the X2 sequences that comprise the same elements are arranged in different orders.

In one embodiment, there are two sequences among the X2 sequences that comprise the same element(s).

In one embodiment, the target multicarrier symbol is a multicarrier symbol among the X1 multicarrier symbols other than a starting multicarrier symbol.

In one embodiment, the target multicarrier symbol is a starting multicarrier symbol of the X1 multicarrier symbols.

In one embodiment, the target multicarrier symbol is any multicarrier symbol of the X1 multicarrier symbols.

In one embodiment, the number of Resource Elements (REs) comprised in the target RE set is greater than 1.

In one embodiment, any RE comprised in the target RE set occupies the target multicarrier symbol in time domain and a subcarrier in frequency domain.

In one embodiment, any RE comprised in the target RE set is occupied by the first PUCCH.

In one embodiment, the target RE set comprises an RE which is not occupied by the first PUCCH.

In one embodiment, the number of REs comprised in the target RE set is equal to 12.

In one embodiment, the target sequence is any sequence among the X2 sequences.

In one embodiment, the target sequence is a sequence among the X2 sequences by which multicarrier symbol(s) being mapped includes(include) an earliest multicarrier symbol among the X1 multicarrier symbols.

In one embodiment, the target sequence is a sequence among the X2 sequences by which multicarrier symbol(s) being mapped does/do not include an earliest multicarrier symbol among the X1 multicarrier symbols.

In one embodiment, the target sequence is a sequence among the X2 sequences by which multicarrier symbol(s) being mapped only includes(include) multicarrier symbol(s) other than an earliest multicarrier symbol among the X1 multicarrier symbols.

In one embodiment, the target sequence is a sequence among the X2 sequences which goes through a cyclic shift of a minimum value.

In one embodiment, the target sequence is a sequence among the X2 sequences which goes through a cyclic shift of a maximum value.

In one embodiment, the target sequence is a sequence among the X2 sequences which goes through an initial cyclic shift.

In one embodiment, the target parameter is $m_{cs}$.

In one embodiment, the target parameter is $m_0$.

In one embodiment, the target parameter is $m_{int}$.

In one embodiment, the statement in the claims that "a target parameter is used to determine a cyclic shift of the target sequence" includes a meaning that: the target parameter is used by the first node or the second node in the present application to determine a cyclic shift of the target sequence.

In one embodiment, the statement in the claims that "a target parameter is used to determine a cyclic shift of the target sequence" includes a meaning that: the target parameter is used for calculating a value of the cyclic shift of the target sequence.

In one embodiment, the statement in the claims that "a target parameter is used to determine a cyclic shift of the target sequence" includes a meaning that: a value of the cyclic shift of the target sequence is linear with the target parameter.

In one embodiment, the statement in the claims that "a target parameter is used to determine a cyclic shift of the target sequence" includes a meaning that: a value of the cyclic shift of the target sequence is linear with a target remainder, the target remainder being equal to a remainder yielded by the target parameter mod the length of the first basic sequence.

In one embodiment, the statement in the claims that "a target parameter is used to determine a cyclic shift of the target sequence" includes a meaning that: the target parameter is used to determine a value of the cyclic shift of the target sequence according to a pre-defined function relationship.

In one embodiment, the statement in the claims that "a target parameter is used to determine a cyclic shift of the target sequence" is implemented by means of:

$$\alpha_{target} = \frac{2\pi}{N_{seq}}((m_{target} + n_{cs}) \bmod N_{seq})$$

where $\alpha_{target}$ represents a value of the cyclic shift of the target sequence, $N_{seq}$ represents a length of the first basic sequence, $m_{target}$ represents the target parameter, and $n_{cs}$ represents a value obtained by means of a pseudo-random sequence.

In one embodiment, any complex-valued symbol mapped to the target RE set is a complex-valued symbol comprised in a complex valued sequence before mapping to physical resources.

In one embodiment, any complex-valued symbol mapped to the target RE set is a complex-valued symbol comprised in a complex valued sequence in an input to mapping to physical resources.

In one embodiment, any complex-valued symbol mapped to the target RE set is a complex-valued symbol comprised in a complex valued sequence being mapped to physical resources.

In one embodiment, any complex-valued symbol mapped to the target RE set is a complex-valued symbol obtained by Amplitude Scaling of a complex valued sequence before mapping to physical resources.

In one embodiment, any complex-valued symbol mapped to the target RE set is a complex-valued symbol obtained by Amplitude Scaling of a complex valued sequence in an input to mapping to physical resources.

In one embodiment, any complex-valued symbol mapped to the target RE set is a complex-valued symbol after being through Amplitude Scaling.

In one embodiment, any complex-valued symbol mapped to the target RE set is a complex-valued symbol before being through Amplitude Scaling.

In one embodiment, the statement in the claims of "the target sequence being used for generating a complex-valued symbol mapped onto the target RE set" includes the following meaning: the target sequence is used by the first node in the present application for generating a complex-valued symbol mapped onto the target RE set.

In one embodiment, the statement in the claims of "the target sequence being used for generating a complex-valued symbol mapped onto the target RE set" includes the following meaning: an element comprised by the target sequence is a complex-valued symbol mapped onto the target RE set.

In one embodiment, the statement in the claims of "the target sequence being used for generating a complex-valued symbol mapped onto the target RE set" includes the following meaning: a complex-valued symbol mapped onto the target RE set is obtained by the target sequence being through Sequence Modulation.

In one embodiment, the statement in the claims of "the target sequence being used for generating a complex-valued symbol mapped onto the target RE set" includes the following meaning: a complex-valued symbol mapped onto the target RE set is obtained by the target sequence being through Sequence Modulation and Block-wise spread.

In one embodiment, the statement in the claims of "the target sequence being used for generating a complex-valued symbol mapped onto the target RE set" includes the following meaning: The target sequence is a sequence obtained by arranging complex-valued symbols mapped onto the target RE set in an order from lower frequency to higher frequency, or reversely.

In one embodiment, the statement in the claims of "the target sequence being used for generating a complex-valued symbol mapped onto the target RE set" includes the following meaning: Elements comprised in the target sequence, after being through Amplitude Scaling, are mapped onto REs comprised in the target RE set in an order from lower frequency to higher frequency, or reversely.

In one embodiment, the statement in the claims of "the target sequence being used for generating a complex-valued symbol mapped onto the target RE set" includes the following meaning: complex valued symbols obtained by Sequence Modulation of the target sequence are firstly through Amplitude Scaling and then mapped onto REs comprised in the target RE set in an order from lower frequency to higher frequency, or reversely.

In one embodiment, the statement in the claims of "the target sequence being used for generating a complex-valued symbol mapped onto the target RE set" includes the following meaning: complex valued symbols obtained by Sequence Modulation and Block-wise spread of the target sequence are firstly through Amplitude Scaling and then mapped onto REs comprised in the target RE set in an order from lower frequency to higher frequency, or reversely.

In one embodiment, element(s) comprised by any of the X2 sequences is(are) mapped to RE(s) comprised by a Resource Element (RE) set that belongs to at least one multicarrier symbol among the X1 multicarrier symbols in time domain.

In one embodiment, any of the X2 sequences is associated with at least one multicarrier symbol among the X1 multicarrier symbols in time domain.

In one embodiment, any of the X2 sequences, after being through Sequence Modulation, is mapped to at least one multicarrier symbol among the X1 multicarrier symbols in time domain.

In one embodiment, any of the X2 sequences corresponds to at least one multicarrier symbol among the X1 multicarrier symbols.

In one embodiment, complex symbol(s) obtained by any of the X2 sequences through Sequence Modulation and Block-wise spread is(are) mapped to RE(s) belonging to at least one multicarrier symbol among the X1 multicarrier symbols in time domain.

In one embodiment, any of the X2 sequences, after being through Amplitude Scaling, is mapped to at least one multicarrier symbol among the X1 multicarrier symbols in time domain.

In one embodiment, any of the X2 sequences, after being through Sequence Modulation, Block-wise spread and Amplitude Scaling, is mapped to at least one multicarrier symbol among the X1 multicarrier symbols in time domain.

In one embodiment, element(s) comprised by any of the X2 sequences, after being through Amplitude Scaling, is(are) mapped to RE(s) comprised by a Resource Element (RE) set that belongs to at least one multicarrier symbol among the X1 multicarrier symbols in time domain.

In one embodiment, complex symbol(s) obtained by any of the X2 sequences through Sequence Modulation and Amplitude Scaling is(are) mapped to RE(s) comprised by a Resource Element (RE) set that belongs to at least one multicarrier symbol among the X1 multicarrier symbols in time domain.

In one embodiment, element(s) comprised by any of the X2 sequences, after being through Amplitude Scaling, is(are) mapped to RE(s) comprised by a Resource Element (RE) set that belongs to at least one multicarrier symbol among the X1 multicarrier symbols in time domain, in an ascending order or a descending order of subcarrier indexes.

In one embodiment, element(s) comprised by any of the X2 sequences, after being through Sequence Modulation and Amplitude Scaling, is(are) mapped to RE(s) comprised by a Resource Element (RE) set that belongs to at least one multicarrier symbol among the X1 multicarrier symbols in time domain, in an ascending order or a descending order of subcarrier indexes.

In one embodiment, X3 is equal to 2.

In one embodiment, X3 is equal to 3.

In one embodiment, X3 is equal to 4.

In one embodiment, X3 is equal to 6.

In one embodiment, X3 is equal to 12.

In one embodiment, X3 is equal to X1.

In one embodiment, X3 is less than X1.

In one embodiment, X3 is less than X2.

In one embodiment, X3 is equal to X2.

In one embodiment, X2 is equal to X1.

In one embodiment, X2 is less than X1.

In one embodiment, X1 is used to determine X3.

In one embodiment, X1 can be divided by X2 with no remainder.

In one embodiment, X1 can be divided by X3 with no remainder.

In one embodiment, the X3 is default.

In one embodiment, the X3 is configurable.

In one embodiment, the X3 candidate parameters are fixed.

In one embodiment, the X3 candidate parameters are pre-defined.

In one embodiment, none of the X3 candidate parameters is related to a pseudo-random sequence.

In one embodiment, none of the X3 candidate parameters is related to any information or payload carried by the first PUCCH.

In one embodiment, the X3 candidate parameters are related to X1.

In one embodiment, any candidate parameter of the X3 candidate parameters is equal to one of multiple candidate values of $m_{cs}$.

In one embodiment, any candidate parameter of the X3 candidate parameters is equal to one of multiple candidate values of $m_0$.

In one embodiment, any candidate parameter of the X3 candidate parameters is equal to one of multiple candidate values of $m_{int}$.

In one embodiment, X1 is used to determine the X3 candidate parameters.

In one embodiment, the Format of the first PUCCH is used to determine the X3 candidate parameters.

In one embodiment, there are two candidate parameters among the X3 candidate parameters between which a difference is equal to half a length of the first basic sequence.

In one embodiment, there are two candidate parameters among the X3 candidate parameters between which a difference is larger than half a length of the first basic sequence.

In one embodiment, for X1 that has been given, the X3 candidate parameters are fixed.

In one embodiment, for a Format of the first PUCCH that has been given, the X3 candidate parameters are fixed.

In one embodiment, for X1 that has been given and a Format of the first PUCCH that has been given, the X3 candidate parameters are fixed.

In one embodiment, with X3 being equal to 2, the X3 candidate parameters are respectively equal to 0 and 6.

In one embodiment, with X3 being equal to 2, a difference between the X3 candidate parameters is equal to 6.

In one embodiment, with X3 being equal to 3, the X3 candidate parameters are respectively equal to 0, 4 and 8.

In one embodiment, with X3 being equal to 3, a difference between any two adjacent candidate parameters among the X3 candidate parameters is equal to 4.

In one embodiment, with X3 being equal to 4, the X3 candidate parameters are respectively equal to 0, 3, 6 and 9.

In one embodiment, with X3 being equal to 4, a difference between any two adjacent candidate parameters among the X3 candidate parameters is equal to 3.

In one embodiment, with X3 being equal to 6, the X3 candidate parameters are respectively equal to 0, 2, 4, 6, 8 and 10.

In one embodiment, with X3 being equal to 6, a difference between any two adjacent candidate parameters among the X3 candidate parameters is equal to 2.

In one embodiment, there is one candidate parameter being equal to 0 among the X3 candidate parameters.

In one embodiment, any candidate parameter among the X3 candidate parameters is greater than 0.

In one embodiment, there are two candidate parameters among the X3 candidate parameters between which a difference is equal to a quotient of a length of the first basic sequence divided by X3.

In one embodiment, there are two candidate parameters among the X3 candidate parameters between which a difference is equal to a quotient of half of a length of the first basic sequence divided by X3.

In one embodiment, a difference between any two adjacent candidate parameters among the X3 candidate parameters is equal to a quotient of a length of the first basic sequence divided by X3.

In one embodiment, a difference between any two adjacent candidate parameters among the X3 candidate parameters is equal to a quotient of half of a length of the first basic sequence divided by X3.

In one embodiment, the statement in the claims that "any candidate parameter among the X3 candidate parameters is used to determine a cyclic shift of at least one sequence among the X2 sequences" includes the following meaning: any candidate parameter among the X3 candidate parameters is used by the first node or the second node in the present application to determine a cyclic shift of at least one sequence among the X2 sequences.

In one embodiment, the statement in the claims that "any candidate parameter among the X3 candidate parameters is used to determine a cyclic shift of at least one sequence among the X2 sequences" includes the following meaning: any candidate parameter among the X3 candidate parameters is used for calculating a value of a cyclic shift of at least one sequence among the X2 sequences.

In one embodiment, the statement in the claims that "any candidate parameter among the X3 candidate parameters is used to determine a cyclic shift of at least one sequence among the X2 sequences" includes the following meaning: any candidate parameter among the X3 candidate parameters is used for calculating a value of a cyclic shift of at least one sequence among the X2 sequences according to a pre-defined function relationship.

In one embodiment, the statement in the claims that "any candidate parameter among the X3 candidate parameters is used to determine a cyclic shift of at least one sequence among the X2 sequences" includes the following meaning: a value of a cyclic shift of at least one sequence among the X2 sequences is linear with a candidate parameter among the X3 candidate parameters.

In one embodiment, the statement in the claims that "any candidate parameter among the X3 candidate parameters is used to determine a cyclic shift of at least one sequence among the X2 sequences" includes the following meaning: a value of a cyclic shift of at least one sequence among the X2 sequences is linear with a characteristic remainder, the characteristic remainder being equal to a remainder yielded by one of the X3 candidate parameters mod a length of the first basic sequence.

In one embodiment, the statement that "a time-domain position of the target multicarrier symbol is used to determine the target parameter out of the X3 candidate parameters" in the claims includes the meaning that: a time-domain position of the target multicarrier symbol is used by the first node in the present application for determining the target parameter out of the X3 candidate parameters.

In one embodiment, the statement that "a time-domain position of the target multicarrier symbol is used to determine the target parameter out of the X3 candidate parameters" in the claims is implemented by means of the Claim 4 in the present application.

In one embodiment, the statement that "a time-domain position of the target multicarrier symbol is used to determine the target parameter out of the X3 candidate parameters" in the claims includes the meaning that: an order or index of the target multicarrier symbol in a slot to which it belongs is used to determine the target parameter out of the X3 candidate parameters.

In one embodiment, the statement that "a time-domain position of the target multicarrier symbol is used to determine the target parameter out of the X3 candidate parameters" in the claims includes the meaning that: an order or index of the target multicarrier symbol among the X1 multicarrier symbols is used to determine the target parameter out of the X3 candidate parameters.

In one embodiment, the statement that "a time-domain position of the target multicarrier symbol is used to determine the target parameter out of the X3 candidate parameters" in the claims includes the meaning that: a frequency-hopping range to which the target multicarrier symbol belongs is used to determine the target parameter out of the X3 candidate parameters.

In one embodiment, the statement that "a time-domain position of the target multicarrier symbol is used to determine the target parameter out of the X3 candidate parameters" in the claims includes the meaning that: an index of a multicarrier symbol set to which the target multicarrier symbol belongs is used to determine the target parameter out of the X3 candidate parameters, where the multicarrier symbol set to which the target multicarrier symbol belongs comprises more than one multicarrier symbol.

In one embodiment, the statement that "a time-domain position of the target multicarrier symbol is used to determine the target parameter out of the X3 candidate parameters" in the claims includes the meaning that: X3 multicarrier symbol sets respectively correspond to the X3 candidate parameters, and any of the X3 multicarrier symbol sets comprises a positive integer number of multicarrier symbol (s); the target multicarrier symbol belongs to a target multicarrier symbol set, the target multicarrier symbol set being one of the X3 multicarrier symbol sets; the target parameter is a candidate parameter among the X3 candidate parameters that corresponds to the target multicarrier symbol set. In one subsidiary embodiment of the above embodiment, any of the X3 multicarrier symbol sets comprises time-domain consecutive multicarrier symbols. In one subsidiary embodiment of the above embodiment, there is a multicarrier symbol set comprised among the X3 multicarrier symbol sets comprising time-domain discrete multicarrier symbols. In one subsidiary embodiment of the above embodiment, any of the X3 multicarrier symbol sets comprises multicarrier symbols at equal time-domain intervals. In one subsidiary embodiment of the above embodiment, numbers of multicarrier symbols comprised by any two multicarrier symbol sets among the X3 multicarrier symbol sets are equal. In one subsidiary embodiment of the above embodiment, a number of multicarrier symbols comprised by any of the X3 multicarrier symbol sets is equal to 2 or 3 or 4 or 6.

Embodiment 2

Figure 2:
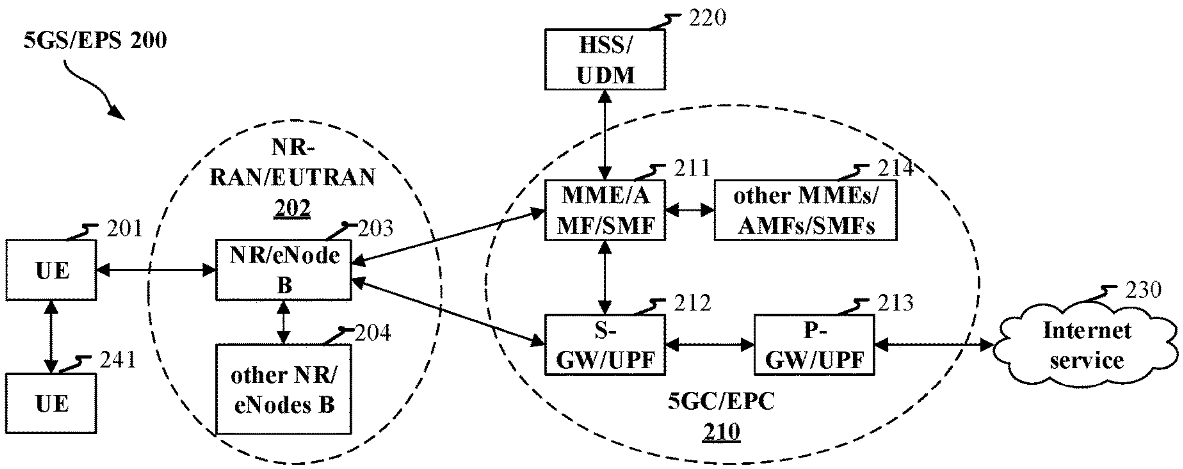
FIG. 2 illustrates a schematic diagram of a network architecture according to one embodiment of the present application.

Embodiment 2 illustrates a schematic diagram of a network architecture according to the present application, as shown in FIG. 2. FIG. 2 is a diagram illustrating a network architecture 200 of 5G NR, Long-Term Evolution (LTE) and Long-Term Evolution Advanced (LTE-A) systems. The 5G NR or LTE network architecture 200 may be called 5G System/Evolved Packet System (5GS/EPS) 200 or other appropriate terms. The 5GS/EPS 200 may comprise one or more UEs 201, an NG-RAN 202, a 5G-Core Network/Evolved Packet Core (5GC/EPC) 210, a Home Subscriber Server/Unified Data Management (HSS/UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will find it easy to understand that various concepts presented throughout the present application can be extended to networks providing circuit switching services or other cellular networks. The NG-RAN 202 comprises an NR/evolved node B (gNB/eNB) 203 and other gNBs(eNBs) 204. The gNB(eNB) 203 provides UE 201 oriented user plane and control plane terminations. The gNB(eNB) 203 may be connected to other gNBs(eNBs) 204 via an Xn/X2 interface (for example, backhaul). The gNB(eNB) 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB(eNB) 203 provides an access point of the 5GC/EPC 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, satellite mobile communications, Global Positioning Systems (GPSs), multimedia devices, video devices, digital audio players (for example, MP3 players), cameras, games consoles, unmanned aerial vehicles, air vehicles, narrow-band physical network equipment, machine-type communication equipment, land vehicles, automobiles, wearable equipment, test equipment, test instrument or test tools, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB(eNB) 203 is connected with the 5G-CN/EPC 210 via an S1/NG interface. The 5G-CN/EPC 210 comprises a Mobility Management Entity (MME)/Authentication Management Field (AMF)/Session Management Function (SMF) 211, other MMEs/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212. The S-GW/UPF 212 is connected to the P-GW/UPF 213. The P-GW 213 provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming (PSS) services.

In one embodiment, the UE 201 corresponds to the first node in the present application.

In one embodiment, the UE 201 supports multicast or broadcast traffic transmission.

In one embodiment, the gNB(eNB) 203 corresponds to the second node in the present application.

In one embodiment, the gNB(eNB) 203 supports multicast or broadcast traffic transmission.

Embodiment 3

Figure 3:
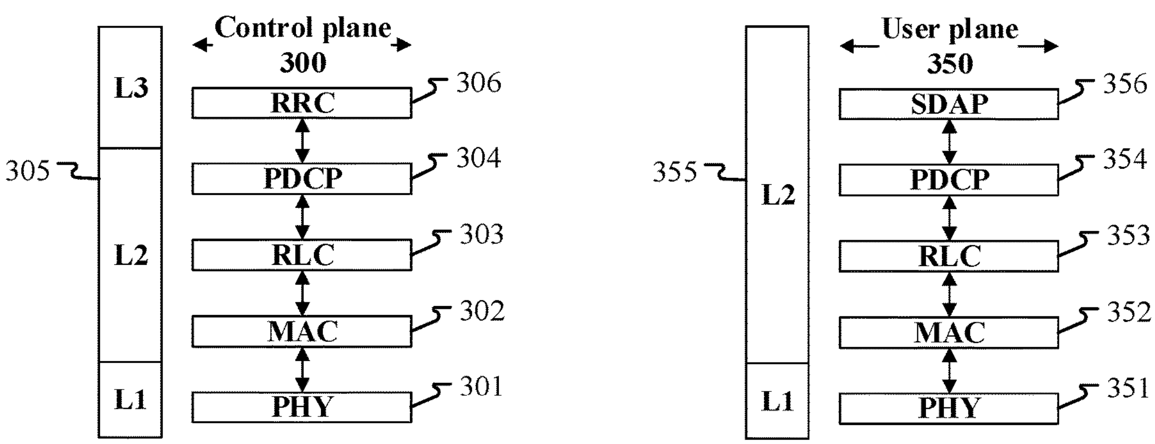
FIG. 3 illustrates a schematic diagram of a radio protocol architecture of a user plane and a control plane according to one embodiment of the present application.

Embodiment 3 illustrates a schematic diagram of a radio protocol architecture of a user plane and a control plane according to the present application, as shown in FIG. 3.

FIG. 3 is a schematic diagram illustrating an embodiment of a radio protocol architecture of a user plane 350 and a control plane 300. In FIG. 3, the radio protocol architecture for a control plane 300 used for a first node (UE or gNB) and a second node (gNB or UE) is represented by three layers, which are a layer 1, a layer 2 and a layer 3, respectively. The layer 1 (L1) is the lowest layer which performs signal processing functions of various PHY layers. The L1 is called PHY 301 in the present application. The layer 2 (L2) 305 is above the PHY 301, and is in charge of the link between the first node and the second node via the PHY 301. The L2 305 comprises a Medium Access Control (MAC) sublayer 302, a Radio Link Control (RLC) sublayer 303 and a Packet Data Convergence Protocol (PDCP) sublayer 304. All the three sublayers terminate at the second nodes of the network side. The PDCP sublayer 304 provides multiplexing among variable radio bearers and logical channels. The PDCP sublayer 304 provides security by encrypting a packet and provides support for handover of a first node between second nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second node and the first node. The radio protocol architecture in the user plane 350 comprises the L1 layer and the L2 layer. In the user plane 350, the radio protocol architecture used for the first node and the second node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first node may comprise several higher layers above the L2 355, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present application.

In one embodiment, the radio protocol architecture in FIG. 3 is applicable to the second node in the present application.

In one embodiment, the first PDCCH in the present application is generated by the PHY301 or the PHY351.

In one embodiment, the first PUCCH in the present application is generated by the PHY301 or the PHY351.

In one embodiment, the first PDSCH in the present application is generated by the RRC306, or the MAC302, or the MAC352, or by the PHY301, or the PHY351.

In one embodiment, the first information block in the present application is generated by the RRC306, or the MAC302, or the MAC352, or by the PHY301, or the PHY351.

Embodiment 4

Figure 4:
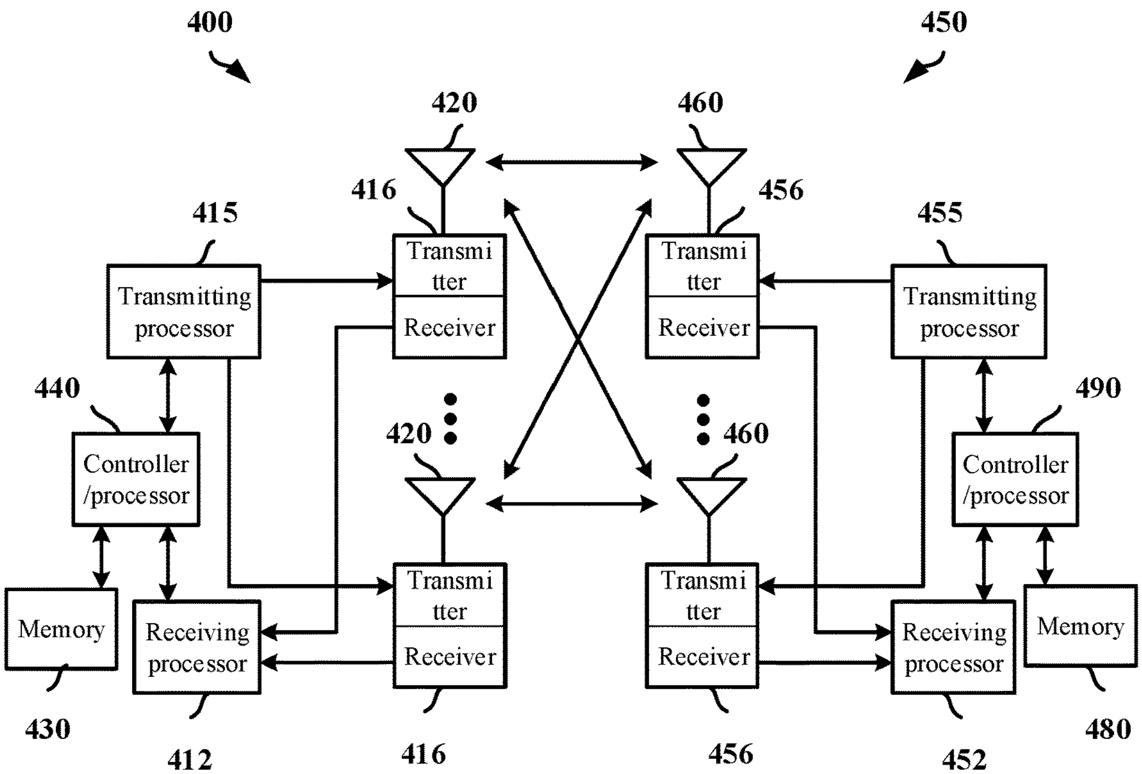
FIG. 4 illustrates a schematic diagram of a first node and a second node according to one embodiment of the present application.

Embodiment 4 illustrates a schematic diagram of a first node and a second node according to one embodiment of the present application, as shown in FIG. 4.

The first node (450) can comprise a controller/processor 490, a data source/buffer 480, a receiving processor 452, a transmitter/receiver 456 and a transmitting processor 455, where the transmitter/receiver 456 comprises an antenna 460.

The second node (410) can comprise a controller/processor 440, a data source/buffer 430, a receiving processor 412, a transmitter/receiver 416 and a transmitting processor 415, where the transmitter/receiver 416 comprises an antenna 420.

In Downlink (DL), a higher layer packet, for instance upper-layer information contained in the first information block and the first PDSCH in the present application is provided to the controller/processor 440. The controller/processor 440 provides functions of the L2 layer and above. In DL, the controller/processor 440 provides header compression, encryption, packet segmentation and reordering, multiplexing between a logical channel and a transport channel as well as radio resources allocation for the first node 450 based on various priorities. The controller/processor 440 is also responsible for HARQ operation, a retransmission of a lost packet and a signaling to the first node 450, for instance, higher-layer information carried in the first information block and the first PDSCH in the present application is generated in the controller/processor 440. The transmitting processor 415 performs various signal processing functions used for the L1 (that is, PHY), including coding, interleaving, scrambling, modulating, power control/allocating, pre-coding and physical layer control signaling generation, for example, the generations of a physical layer signal for the first PDCCH, a physical layer signal for the first PDSCH and a physical layer signal carrying the first information block in the present application are completed in the transmitting processor 415. Modulation symbols that have been generated are divided into parallel streams and each of them is mapped onto a corresponding multicarrier subcarrier and/or multicarrier symbol, and then is mapped by the transmitting processor 415 to the antenna 420 via the transmitter 416 to be transmitted in the form of radio frequency signals. At the receiving end, each receiver 456 receives a radio frequency signal via a corresponding antenna 460, and recovers baseband information modulated onto a radio frequency carrier and provides the baseband information to the receiving processor 452. The receiving processor 452 performs various signal receiving processing functions used for the L1. Signal receiving processing functions include receiving of physical layer signals for the first PDCCH, for the first PDSCH and carrying the first information block in the present application, and demodulating multicarrier symbols in multicarrier symbol streams based on various modulation schemes (i.E., BPSK, QPSK), then de-scrambling, decoding and de-interleaving to recover data or control signal transmitted by the second node 410 on a physical channel, and providing the data and control signal to the controller/processor 490. The controller/processor 490 is in charge of the L2 and above layers, the controller/processor 490 interprets higher-layer information carried in the first information block and the first PDSCH in the present application. The controller/processor can be associated with the memory 480 that stores program code and data; the memory 480 may be called a computer readable medium.

In UL transmission, which is similar to DL, higher-layer information, upon generation in the controller/processor 490, is through the transmitting processor 455 to perform signal transmitting processing functions used for the L1(that is, PHY), for instance, the first PUCCH in the present application is generated in the transmitting processor 455, and is then mapped to the antenna 460 via the transmitter 456 from the transmitting processor 455 and transmitted in the form of radio frequency signals. The receiver 416 receives a radio frequency signal via a corresponding antenna 420, and each receiver 416 recovers baseband information modulated onto a radio frequency carrier and provides the baseband information to the receiving processor 412. The receiving processor 412 performs various signal reception processing functions used for L1 (i.e., PHY), including receiving the first PUCCH in the present application and then providing data and/or control signal to the controller/processor 440. The functionality implemented by the controller/processor 440 includes interpretation of higher-layer information. The controller/processor can be associated with the buffer 430 that stores program code and data; the buffer 430 may be called a computer readable medium.

In one embodiment, the first node 450 comprises at least one processor and at least one memory, the at least one memory comprises computer program codes; The at least one memory and the computer program codes are configured to be used in collaboration with the at least one processor. The first node 450 at least receives a first PDCCH; and transmits a first PUCCH, the first PUCCH occupying X1 multicarrier symbols in time domain, and the first PDCCH being used to determine a starting multicarrier symbol among the X1 multicarrier symbols, where X1 is a positive integer greater than 1; herein, a first basic sequence is used for generating the first PUCCH, and X2 sequences are generated by the first basic sequence through cyclic shifts, any two sequences among the X2 sequences are different, where X2 is a positive integer greater than 1; a target multicarrier symbol is one of the X1 multicarrier symbols, and a target Resource Element (RE) set comprises multiple REs occupied by the first PUCCH, any RE comprised by the target RE set occupying the target multicarrier symbol in time domain; a target sequence is one of the X2 sequences, and a target parameter is used to determine a cyclic shift of the target sequence, the target sequence being used for generating a complex-valued symbol mapped onto the target RE set; the target parameter is one of X3 candidate parameters, and any candidate parameter among the X3 candidate parameters is a non-negative integer smaller than a length of the first basic sequence, X3 being a positive integer greater than 1; there are two candidate parameters among the X3 candidate parameters between which a difference is no smaller than half the length of the first basic sequence, and any candidate parameter among the X3 candidate parameters is used to determine a cyclic shift of at least one sequence among the X2 sequences; a time-domain position of the target multicarrier symbol is used to determine the target parameter out of the X3 candidate parameters.

In one embodiment, the first node 450 comprises a memory that stores a computer readable instruction program, the computer readable instruction program generates actions when executed by at least one processor, which include: receiving a first PDCCH; and transmitting a first PUCCH, the first PUCCH occupying X1 multicarrier symbols in time domain, and the first PDCCH being used to determine a starting multicarrier symbol among the X1 multicarrier symbols, where X1 is a positive integer greater than 1; herein, a first basic sequence is used for generating the first PUCCH, and X2 sequences are generated by the first basic sequence through cyclic shifts, any two sequences among the X2 sequences are different, where X2 is a positive integer greater than 1; a target multicarrier symbol is one of the X1 multicarrier symbols, and a target Resource Element (RE) set comprises multiple REs occupied by the first PUCCH, any RE comprised by the target RE set occupying the target multicarrier symbol in time domain; a target sequence is one of the X2 sequences, and a target parameter is used to determine a cyclic shift of the target sequence, the target sequence being used for generating a complex-valued symbol mapped onto the target RE set; the target parameter is one of X3 candidate parameters, and any candidate parameter among the X3 candidate parameters is a non-negative integer smaller than a length of the first basic sequence, X3 being a positive integer greater than 1; there are two candidate parameters among the X3 candidate parameters between which a difference is no smaller than half the length of the first basic sequence, and any candidate parameter among the X3 candidate parameters is used to determine a cyclic shift of at least one sequence among the X2 sequences; a time-domain position of the target multicarrier symbol is used to determine the target parameter out of the X3 candidate parameters.

In one embodiment, the second device 410 comprises at least one processor and at least one memory, the at least one memory comprises computer program codes; the at least one memory and the computer program codes are configured to be used in collaboration with the at least one processor. The second device 410 at least: transmits a first PDCCH; and receives a first PUCCH, the first PUCCH occupying X1 multicarrier symbols in time domain, and the first PDCCH being used to indicate a starting multicarrier symbol among the X1 multicarrier symbols, where X1 is a positive integer greater than 1; herein, a first basic sequence is used for generating the first PUCCH, and X2 sequences are generated by the first basic sequence through cyclic shifts, any two sequences among the X2 sequences are different, where X2 is a positive integer greater than 1; a target multicarrier symbol is one of the X1 multicarrier symbols, and a target Resource Element (RE) set comprises multiple REs occupied by the first PUCCH, any RE comprised by the target RE set occupying the target multicarrier symbol in time domain; a target sequence is one of the X2 sequences, and a target parameter is used to determine a cyclic shift of the target sequence, the target sequence being used for generating a complex-valued symbol mapped onto the target RE set; the target parameter is one of X3 candidate parameters, and any candidate parameter among the X3 candidate parameters is a non-negative integer smaller than a length of the first basic sequence, X3 being a positive integer greater than 1; there are two candidate parameters among the X3 candidate parameters between which a difference is no smaller than half the length of the first basic sequence, and any candidate parameter among the X3 candidate parameters is used to determine a cyclic shift of at least one sequence among the X2 sequences; a time-domain position of the target multicarrier symbol is used to determine the target parameter out of the X3 candidate parameters.

In one embodiment, the second node 410 comprises a memory that stores a computer readable instruction program, the computer readable instruction program generates actions when executed by at least one processor, which include: transmitting a first PDCCH; and receiving a first PUCCH, the first PUCCH occupying X1 multicarrier symbols in time domain, and the first PDCCH being used to indicate a starting multicarrier symbol among the X1 multicarrier symbols, where X1 is a positive integer greater than 1; herein, a first basic sequence is used for generating the first PUCCH, and X2 sequences are generated by the first basic sequence through cyclic shifts, any two sequences among the X2 sequences are different, where X2 is a positive integer greater than 1; a target multicarrier symbol is one of the X1 multicarrier symbols, and a target Resource Element (RE) set comprises multiple REs occupied by the first PUCCH, any RE comprised by the target RE set occupying the target multicarrier symbol in time domain; a target sequence is one of the X2 sequences, and a target parameter is used to determine a cyclic shift of the target sequence, the target sequence being used for generating a complex-valued symbol mapped onto the target RE set; the target parameter is one of X3 candidate parameters, and any candidate parameter among the X3 candidate parameters is a non-negative integer smaller than a length of the first basic sequence, X3 being a positive integer greater than 1; there are two candidate parameters among the X3 candidate parameters between which a difference is no smaller than half the length of the first basic sequence, and any candidate parameter among the X3 candidate parameters is used to determine a cyclic shift of at least one sequence among the X2 sequences; a time-domain position of the target multicarrier symbol is used to determine the target parameter out of the X3 candidate parameters.

In one embodiment, the first node 450 is a UE.

In one embodiment, the first node 450 is a UE supporting multicast or broadcast services.

In one embodiment, the second node 410 is a base station (gNB/eNB).

In one embodiment, the second node 410 is a UE supporting multicast or broadcast services.

In one embodiment, the transmitter 456 (comprising the antenna 460) and the receiving processor 452 are used for receiving the first PDCCH in the present application.

In one embodiment, the transmitter 456 (comprising the antenna 460) and the transmitting processor 455 are used for transmitting the first PUCCH in the present application.

In one embodiment, the receiver 456 (comprising the antenna 460), the receiving processor 452 and the controller/processor 490 are used for receiving the first PDSCH in the present application.

In one embodiment, the receiver 456 (comprising the antenna 460), the receiving processor 452 and the controller/processor 490 are used for receiving the first information block in the present application.

In one embodiment, the transmitter 416 (comprising the antenna 420) and the transmitting processor 415 are used for transmitting the first PDCCH in the present application.

In one embodiment, the receiver 416 (comprising the antenna 420) and the receiving processor 412 are used for receiving the first PUCCH in the present application.

In one embodiment, the transmitter 416 (comprising the antenna 420), the transmitting processor 415 and the controller/processor 440 are used for transmitting the first PDSCH in the present application.

In one embodiment, the transmitter 416 (comprising the antenna 420), the transmitting processor 415 and the controller/processor 440 are used for transmitting the first information block in the present application.

Embodiment 5

Figure 5:
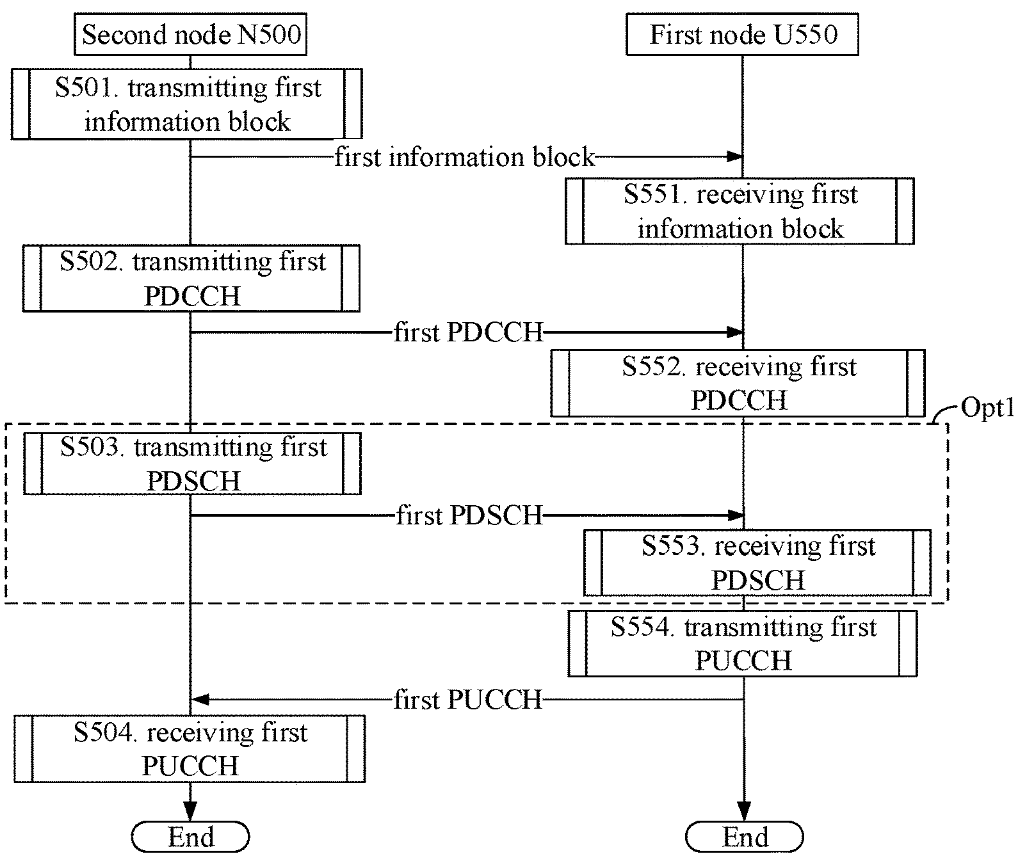
FIG. 5 illustrates a flowchart of radio signal transmission according to one embodiment of the present application.

Embodiment 5 illustrates a flowchart of radio signal transmission according to one embodiment of the present application, as shown in FIG. 5. In FIG. 5, a second node N500 is a maintenance base station for a serving cell of a first node U550, where steps enclosed by the dotted-line box marked by Opt1 are optional. It should be particularly noted that the sequence illustrated herein does not set any limit to the signal transmission order or implementation order in the present application.

The second node N500 transmits a first information block in step S501, transmits a first PDCCH in step S502, and transmits a first PDSCH in step S503, and receives a first PUCCH in step S504.

The first node U550 receives a first information block in step S551, receives a first PDCCH in step S552, and receives a first PDSCH in step S553, and transmits a first PUCCH in step S554.

In Embodiment 5, the first PUCCH occupies X1 multicarrier symbols in time domain, and the first PDCCH is used to determine a starting multicarrier symbol among the X1 multicarrier symbols, where X1 is a positive integer greater than 1; a first basic sequence is used for generating the first PUCCH, and X2 sequences are generated by the first basic sequence through cyclic shifts, any two sequences among the X2 sequences are different, where X2 is a positive integer greater than 1; a target multicarrier symbol is one of the X1 multicarrier symbols, and a target Resource Element (RE) set comprises multiple REs occupied by the first PUCCH, any RE comprised by the target RE set occupying the target multicarrier symbol in time domain; a target sequence is one of the X2 sequences, and a target parameter is used to determine a cyclic shift of the target sequence, the target sequence being used for generating a complex-valued symbol mapped onto the target RE set; the target parameter is one of X3 candidate parameters, and any candidate parameter among the X3 candidate parameters is a non-negative integer smaller than a length of the first basic sequence, X3 being a positive integer greater than 1; there are two candidate parameters among the X3 candidate parameters between which a difference is no smaller than half the length of the first basic sequence, and any candidate parameter among the X3 candidate parameters is used to determine a cyclic shift of at least one sequence among the X2 sequences; a time-domain position of the target multicarrier symbol is used to determine the target parameter out of the X3 candidate parameters; the first PDSCH carries a first bit block, the first bit block comprising at least one bit, the first PUCCH being used to indicate that the first bit block is incorrectly decoded; the first information block is used to determine the X1 multicarrier symbols, and the first information block is used to determine whether the first PUCCH uses frequency hopping.

In one embodiment, the first information block is transmitted via an air interface.

In one embodiment, the first information block is transmitted via a radio interface.

In one embodiment, the first information block comprises all or part of a higher layer signaling.

In one embodiment, the first information block comprises all or part of a physical layer signaling.

In one embodiment, the first information block comprises all or part of a Radio Resource Control (RRC) signaling.

In one embodiment, the first information block comprises all or part of a Medium Access Control (MAC) layer signaling.

In one embodiment, the first information block comprises all or part of a System Information Block (SIB).

In one embodiment, the first information block is Cell Specific.

In one embodiment, the first information block is UE-specific.

In one embodiment, the first information block is Per Bandwidth-Part (BWP) Configured.

In one embodiment, the first information block comprises all or partial fields in a Downlink Control Information (DCI) signaling.

In one embodiment, the first information block comprises more than one sub-information-block, and each sub-information-block comprised in the first information block is an Information Element (IE) or a field in an RRC signaling to which the first information block belongs; one or more of the sub-information blocks comprised in the first information block is/are used to determine the X1 multicarrier symbols.

In one embodiment, the first information block comprises all or partial fields in an Information Element (IE) "PUCCH-ConfigCommon" in an RRC signaling.

In one embodiment, the first information block comprises all or partial fields in an Information Element (IE) "BWP-UplinkDedicated" in an RRC signaling.

In one embodiment, the first information block comprises all or partial fields in an Information Element (IE) "PUCCH-Config" in an RRC signaling.

In one embodiment, the first information block comprises a field "nrofSymbols" in a field "PUCCH-format0" or a field "PUCCH-format1" or a field "PUCCH-format2" or a field "PUCCH-format3" or a field "PUCCH-format4" in an Information Element (IE) "PUCCH-Config" in an RRC signaling.

In one embodiment, the first information block comprises a field "intraSlotFrequencyHopping" in a field "PUCCH-Resource" in an Information Element (IE) "PUCCH-Config" in an RRC signaling.

In one embodiment, the statement in the claims that "the first information block is used to determine the X1 multicarrier symbols" includes the following meaning: the first information block is used by the first node in the present application for determining the X1 multicarrier symbols.

In one embodiment, the statement in the claims that "the first information block is used to determine the X1 multicarrier symbols" includes the following meaning: the first information block is used for explicitly or implicitly indicating the X1 multicarrier symbols.

In one embodiment, the statement in the claims that "the first information block is used to determine the X1 multicarrier symbols" includes the following meaning: the first information block is used to indicate the X1.

In one embodiment, the statement in the claims that "the first information block is used to determine whether the first PUCCH uses frequency hopping" includes the following meaning: the first information block is used by the first node in the present application for determining whether the first PUCCH uses frequency hopping.

In one embodiment, the statement in the claims that "the first information block is used to determine whether the first PUCCH uses frequency hopping" includes the following meaning: the first information block is used for explicitly or implicitly indicating whether the first PUCCH uses frequency hopping.

In one embodiment, the statement in the claims that "the first information block is used to determine whether the first PUCCH uses frequency hopping" includes the following meaning: the first information block is used for enabling frequency hopping of the first PUCCH.

Embodiment 6

Figure 6:
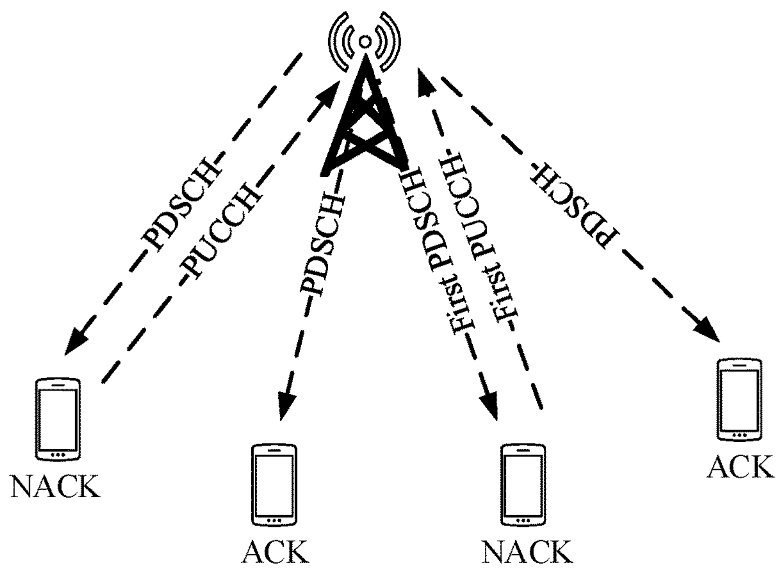
FIG. 6 illustrates a schematic diagram of a relation between a first PDSCH and a first PUCCH according to one embodiment of the present application.

Embodiment 6 illustrates a schematic diagram of a relation between a first PDSCH and a first PUCCH according to one embodiment of the present application, as shown in FIG. 6. In FIG. 6, when a UE correctly decodes a PDSCH, the UE does not transmit an ACK; when the UE incorrectly decodes the PDSCH, the UE transmits a PUCCH.

In Embodiment 6, the first PDSCH in the present application carries a first bit block, the first bit block comprising at least one bit, the first PUCCH in the present application being used to indicate that the first bit block is incorrectly decoded.

In one embodiment, the first PDSCH comprises a radio frequency signal in a Physical Downlink Shared Channel (PDSCH).

In one embodiment, the first PDSCH comprises a baseband signal in a PDSCH.

In one embodiment, the first PDSCH is transmitted via a wireless interface.

In one embodiment, the first PDSCH is a Semi-Persistent Scheduling (SPS) PDSCH.

In one embodiment, the first PDSCH is a dynamically scheduling PDSCH.

In one embodiment, the first PDSCH is unicast.

In one embodiment, the first PDSCH is multicast or broadcast.

In one embodiment, an RNTI other than the C-RNTI is used to initialize a Generator of scrambling for the first PDSCH.

In one embodiment, the first PDCCH is used to determine at least one of a time-domain resource or a frequency-domain resource occupied by the first PDSCH.

In one embodiment, the first PDCCH is used to determine a Redundancy Version (RV) and a Modulation and Coding Scheme (MCS) used by the first PDSCH.

In one embodiment, the first PDCCH is used for activating an SPS Process to which the first PDSCH belongs.

In one embodiment, the first bit block is a Transport Block (TB).

In one embodiment, the first bit block is a Code Block (CB).

In one embodiment, the first bit block is a Code Block Group (CBG).

In one embodiment, the first bit block comprises all or part of a TB.

In one embodiment, the statement in the claims that "the first PDSCH carries a first bit block" includes the following meaning: the first bit block is used for generating the first PDSCH.

In one embodiment, the statement in the claims that "the first PDSCH carries a first bit block" includes the following meaning: the first PDSCH is used for transmitting the first bit block.

In one embodiment, the statement in the claims that "the first PDSCH carries a first bit block" includes the following meaning: the first PDSCH is a physical channel transmitting the first bit block.

In one embodiment, the statement in the claims that "the first PDSCH carries a first bit block" includes the following meaning: the first PDSCH is generated by the first bit block sequentially through TB CRC Attachment, Low Density Parity Check Code (LDPC) Base graph selection, Code Block (CB) Segmentation and CB CRC Attachment, Channel Coding, Rate Matching, CB Concatenation, Scrambling, Modulation, Layer mapping, Antenna port mapping, Mapping to virtual resource blocks, Mapping from virtual to physical resource blocks, and OFDM baseband signal generation.

In one embodiment, the statement in the claims that "the first PDSCH carries a first bit block" includes the following meaning: the first PDSCH is generated by the first bit block sequentially through TB CRC Attachment, Low Density Parity Check Code (LDPC) Base graph selection, Code Block (CB) Segmentation and CB CRC Attachment, Channel Coding, Rate Matching, CB Concatenation, Scrambling, Modulation, Layer mapping, Antenna port mapping, Mapping to virtual resource blocks, Mapping from virtual to physical resource blocks, and OFDM baseband signal generation, as well as Modulation and upconversion.

In one embodiment, the first bit block is a TB, and the first PDSCH only carries the first bit block.

In one embodiment, the first bit block is a TB, and the first PDSCH also carries a Transport Block other than the first bit block.

In one embodiment, the statement in the claims that "the first PUCCH being used to indicate that the first bit block is incorrectly decoded" includes the following meaning: the first PUCCH being used by the first node in the present application to indicate that the first bit block is incorrectly decoded.

In one embodiment, the statement in the claims that "the first PUCCH being used to indicate that the first bit block is incorrectly decoded" includes the following meaning: the first PUCCH being used to explicitly or implicitly indicate that the first bit block is incorrectly decoded.

In one embodiment, the statement in the claims that "the first PUCCH being used to indicate that the first bit block is incorrectly decoded" includes the following meaning: an Energy Detection for the first PUCCH being used to determine that the first bit block is incorrectly decoded.

In one embodiment, the statement in the claims that "the first PUCCH being used to indicate that the first bit block is incorrectly decoded" includes the following meaning: whether the first PUCCH is transmitted being used to indicate whether the first bit block is incorrectly decoded.

In one embodiment, the statement in the claims that "the first PUCCH being used to indicate that the first bit block is incorrectly decoded" includes the following meaning: the first PUCCH being transmitted or detected indicating that the first bit block is incorrectly decoded, while the first PUCCH not being transmitted or detected indicating that the first bit block is correctly decoded.

In one embodiment, the statement in the claims that "the first PUCCH being used to indicate that the first bit block is incorrectly decoded" includes the following meaning: the first PUCCH being used to indicate a NACK of the first bit block.

In one embodiment, the statement in the claims that "the first PUCCH being used to indicate that the first bit block is incorrectly decoded" includes the following meaning: the first PUCCH only being used to indicate that the first bit block is incorrectly decoded.

In one embodiment, the statement in the claims that "the first PUCCH being used to indicate that the first bit block is incorrectly decoded" includes the following meaning: the first PUCCH carrying NACK-only information of the first bit block.

In one embodiment, the first information block in the present application is used to determine that the first PUCCH only carries a NACK feedback of the first bit block.

In one embodiment, the first information block in the present application is used to indicate whether the first node sends an ACK/NACK for feedback or sends only a NACK for feedback.

In one embodiment, the first PDCCH is used to indicate whether the first node sends an ACK/NACK for feedback or sends only a NACK for feedback.

In one embodiment, the first receiver receives a second information block; herein, the second information block is used to indicate whether the first node sends an ACK/NACK for feedback or sends only a NACK for feedback.

In one embodiment, the first PUCCH being transmitted or being detected cannot indicate that the first bit block is correctly decoded.

In one embodiment, the first PUCCH being transmitted or being detected cannot indicate ACK information of the first bit block.

Embodiment 7

Figure 7:
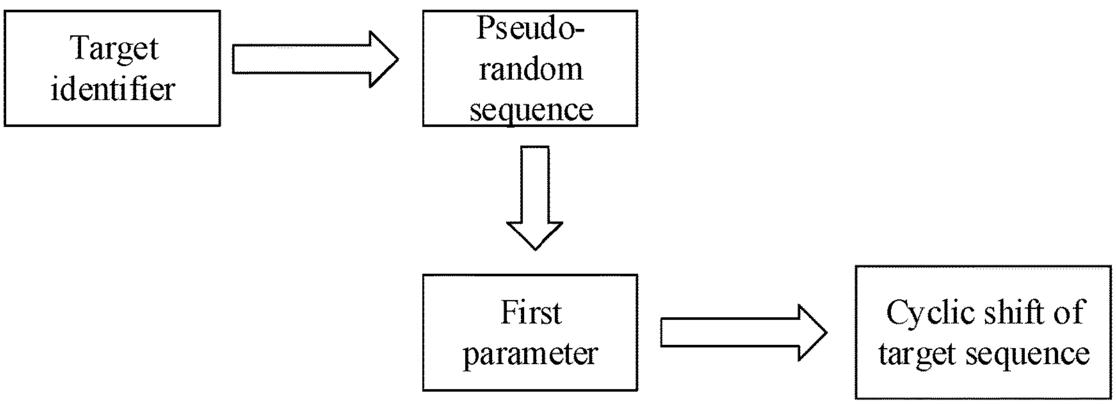
FIG. 7 illustrates a schematic diagram of a first parameter according to one embodiment of the present application.

Embodiment 7 illustrates a schematic diagram of a first parameter according to one embodiment of the present application, as shown in FIG. 7. In FIG. 7, each box represents an intermediate value or an intermediate variable, with an arrowhead indicating the relation between determining and being determined.

In Embodiment 7, a first parameter is used to determine a cyclic shift of the target sequence in the present application, and a pseudo-random sequence is used to determine the first parameter, the first parameter being a non-negative integer; a target identifier is used to determine an initial value of a generator of the pseudo-random sequence; the target identifier is configurable, or the target identifier is pre-defined.

In one embodiment, the first parameter is less than 256.

In one embodiment, the first parameter is equal to an integer of 0 through 255.

In one embodiment, the first parameter can be greater than or equal to 256.

In one embodiment, the statement in the claims that "a first parameter is used to determine a cyclic shift of the target sequence" includes a meaning that: the first parameter is used by the first node or the second node in the present application to determine a cyclic shift of the target sequence.

In one embodiment, the statement in the claims that "a first parameter is used to determine a cyclic shift of the target sequence" includes a meaning that: the cyclic shift of the target sequence is linear with the first parameter.

In one embodiment, the statement in the claims that "a first parameter is used to determine a cyclic shift of the target sequence" includes a meaning that: the first parameter is used for calculating a value of the cyclic shift of the target sequence.

In one embodiment, the statement in the claims that "a first parameter is used to determine a cyclic shift of the target sequence" includes a meaning that: a value of the cyclic shift of the target sequence is linear with a first remainder, the first remainder being equal to a remainder yielded by the first parameter mod the length of the first basic sequence.

In one embodiment, the statement in the claims that "a first parameter is used to determine a cyclic shift of the target sequence" includes a meaning that: the first parameter is used to determine a value of the cyclic shift of the target sequence according to a pre-defined function relationship.

In one embodiment, the statement in the claims that "a first parameter is used to determine a cyclic shift of the target sequence" is implemented by means of:

$$\alpha_{target} = \frac{2\pi}{N_{seq}}((m_{target} + n_{cs}) \bmod N_{seq})$$

where $\alpha_{target}$ represents a value of the cyclic shift of the target sequence, $N_{seq}$ represents a length of the first basic sequence, $m_{target}$ represents the target parameter in the present application, and $n_{cs}$ represents the first parameter.

In one embodiment, the first parameter is unrelated to a position or an index of the target multicarrier symbol among the X1 multicarrier symbols.

In one embodiment, a position or an index of the target multicarrier symbol among the X1 multicarrier symbols is used to determine the first parameter.

In one embodiment, a position or an index of the target multicarrier symbol in a slot to which it belongs is used to determine the first parameter.

In one embodiment, only the latter one between an index of the target multicarrier symbol in the X1 multicarrier symbols and an index of the target multicarrier symbol in a slot to which it belongs is used to determine the first parameter.

In one embodiment, numbering of a slot to which a starting multicarrier symbol of the X1 multicarrier symbols belongs in a Radio Frame is used to determine the first parameter.

In one embodiment, the first parameter is applicable to each multicarrier symbol among the X1 multicarrier symbols.

In one embodiment, the first parameter is used to determine a value of a cyclic shift of each sequence among the X2 sequences.

In one embodiment, the first parameter is applicable to each sequence among the X2 sequences.

In one embodiment, the first parameter is generated only in a starting multicarrier symbol among the X1 multicarrier symbols.

In one embodiment, the first parameter is generated in the target multicarrier symbol.

In one embodiment, a cyclic shift of each sequence among the X2 sequences uses the identical first parameter.

In one embodiment, the first parameter is only used to determine a value of a cyclic shift of the target sequence among the X2 sequences.

In one embodiment, the statement in the claims that "a pseudo-random sequence is used to determine the first parameter" includes the following meaning: the pseudo-random sequence is used by the first node in the present application to determine the first parameter.

In one embodiment, the statement in the claims that "a pseudo-random sequence is used to determine the first parameter" includes the following meaning: the pseudo-random sequence is used to determine the first parameter based on a pre-defined function relationship.

In one embodiment, the statement in the claims that "a pseudo-random sequence is used to determine the first parameter" includes the following meaning: a Gold sequence of a length of 31 is used to determine the first parameter.

In one embodiment, the statement in the claims that "a pseudo-random sequence is used to determine the first parameter" is implemented by means of:

$$n_{cs}(n^{\mu}_{s,f}, l) = \sum_{m=0}^{7} 2^m c(8N^{slot}_{symb} n^{\mu}_{s,f} + 8l + m)$$

where $$n_{cs}(n_{s,f}^{\mu}, l)$$

represents the first parameter, l represents an index of a starting multicarrier symbol of the X1 multicarrier symbols in a slot to which the starting multicarrier symbol belongs, and N $$N_{symb}^{slot}$$

represents a number of multicarrier symbol(s) comprised by the slot to which the starting multicarrier symbol of the X1 multicarrier symbols belongs, and $$n_{s,f}^{\mu}$$

represents numbering of the slot to which a starting multicarrier symbol of the X1 multicarrier symbols belongs in a Radio Frame, and c(i), i=0, 1, 2 . . . represents a pseudo-random sequence.

In one embodiment, the statement in the claims that "a pseudo-random sequence is used to determine the first parameter" is implemented by means of:

$$n_{cs}(n_{s,f}^{\mu}, l) = \sum_{m=0}^{7} 2^m c(8N_{symb}^{slot} n_{s,f}^{\mu} + 8l + m)$$

where $$n_{cs}(n_{s,f}^{\mu}, l)$$

represents the first parameter, l represents an index of a starting multicarrier symbol of the X1 multicarrier symbols in a slot to which the starting multicarrier symbol belongs, and $$N_{symb}^{slot}$$

represents a number of multicarrier symbol(s) comprised by the slot to which the starting multicarrier symbol of the X1 multicarrier symbols belongs, and $$n_{s,f}^{\mu}$$

represents numbering of the slot to which a starting multicarrier symbol of the X1 multicarrier symbols belongs in a Radio Frame, and c(i), i=0, 1, 2 . . . represents a pseudo-random sequence.

In one embodiment, the target identifier is a non-negative integer.

In one embodiment, the target identifier is equal to an integer among 0 through 1023.

In one embodiment, the target identifier is equal to an integer among 0 through 1007.

In one embodiment, the target identifier is equal to an identifier of a cell.

In one embodiment, the target identifier is a Physical-layer cell identity.

In one embodiment, the target identifier is equal to an identifier of a cell to which the first PDCCH belongs.

In one embodiment, the statement in the claims that "a target identifier is used to determine an initial value of a generator of the pseudo-random sequence" includes a meaning that: the target identifier is used by the first node or the second node in the present application to determine an initial value of a generator of the pseudo-random sequence.

In one embodiment, the statement in the claims that "a target identifier is used to determine an initial value of a generator of the pseudo-random sequence" includes a meaning that: the target identifier is equal to an initial value of a generator of the pseudo-random sequence.

In one embodiment, the statement in the claims that "a target identifier is used to determine an initial value of a generator of the pseudo-random sequence" includes a meaning that: the target identifier is used for calculating an initial value of a generator of the pseudo-random sequence.

In one embodiment, the statement in the claims that "a target identifier is used to determine an initial value of a generator of the pseudo-random sequence" includes a meaning that: a binary value corresponding to an initial state of a register for a generator of the pseudo-random sequence is equal to the target identifier expressed in a binary format.

In one embodiment, the statement in the claims that "a target identifier is used to determine an initial value of a generator of the pseudo-random sequence" includes a meaning that: an initial value of a generator of the pseudo-random sequence is linear with the target identifier.

In one embodiment, the statement that "the target identifier is configurable" in the claims includes the following meaning: the first information block in the present application is used for explicitly or implicitly indicating the target identifier.

In one embodiment, the statement that "the target identifier is configurable" in the claims includes the following meaning: a signaling other than the first information block in the present application is used for indicating the target identifier.

In one embodiment, the statement that "the target identifier is configurable" in the claims includes the following meaning: the target identifier is configured by a signaling.

In one embodiment, the statement that "the target identifier is pre-defined" in the claims includes the following meaning: the target identifier is fixed.

In one embodiment, the statement that "the target identifier is pre-defined" in the claims includes the following meaning: the target identifier is equal to a Physical-layer cell identity.

In one embodiment, the statement that "the target identifier is pre-defined" in the claims includes the following meaning: the target identifier is equal to an identifier of a cell to which the first PDCCH belongs.

In one embodiment, the target parameter is unrelated to the target identifier.

In one embodiment, any candidate parameter among the X3 candidate parameters is unrelated to the target identifier.

In one embodiment, the target parameter is unrelated to a pseudo-random sequence.

In one embodiment, any candidate parameter among the X3 candidate parameters is unrelated to the pseudo-random sequence.

Embodiment 8

Figure 8:
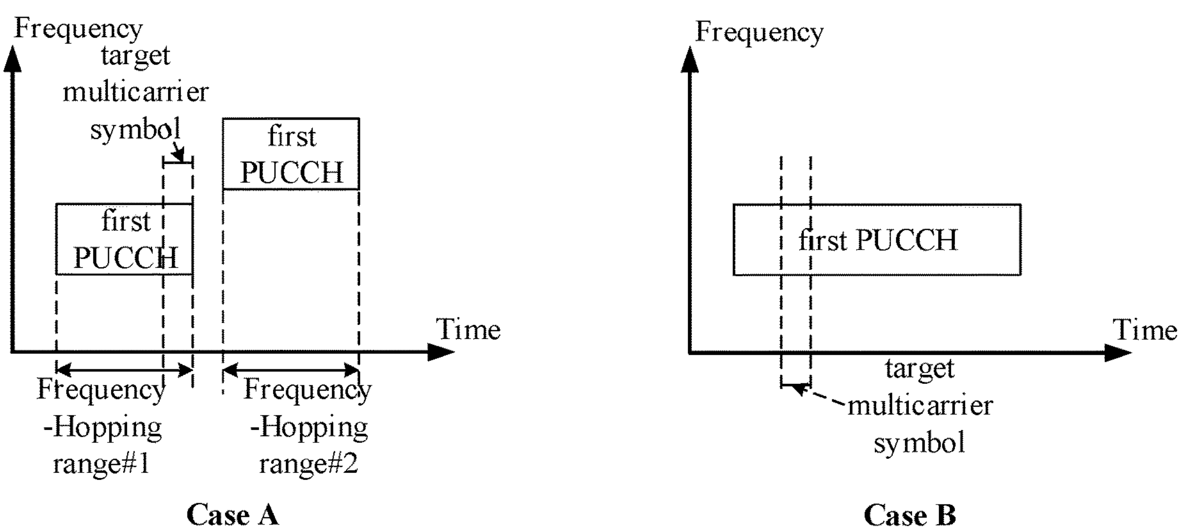
FIG. 8 illustrates a schematic diagram of a target multicarrier symbol according to one embodiment of the present application.

Embodiment 8 illustrates a schematic diagram of a target multicarrier symbol according to one embodiment of the present application, as shown in FIG. 8. In FIG. 8, as given in Case A and Case B, the horizontal axis represents time, while the vertical axis represents frequency; each rectangular box represents time-frequency resources occupied by a first PUCCH; In Case A, the first PUCCH uses frequency hopping; in Case B, the first PUCCH does not use frequency hopping.

In Embodiment 8, the first information block in the present application is used to determine the X1 multicarrier symbols in the present application, the first information block being used to determine whether the first PUCCH in the present application uses frequency hopping; when the first PUCCH uses frequency hopping, a frequency-hopping range to which the target multicarrier symbol in the present application belongs is used to determine the target parameter out of the X3 candidate parameters in the present application; otherwise, a position of the target multicarrier symbol among the X1 multicarrier symbols in the present application is used to determine the target parameter out of the X3 candidate parameters.

In one embodiment, when the first PUCCH uses frequency hopping, a number of frequency-hopping ranges of the first PUCCH is equal to 2.

In one embodiment, when the first PUCCH uses frequency hopping, a number of frequency-hopping ranges of the first PUCCH is greater than 2.

In one embodiment, when the first PUCCH uses frequency hopping, a number of hops of the first PUCCH is equal to 2.

In one embodiment, when the first PUCCH uses frequency hopping, a number of hops of the first PUCCH is greater than 2.

In one embodiment, a frequency-hopping range to which the target multicarrier symbol belongs refers to a Hop to which the target multicarrier symbol belongs in time domain.

In one embodiment, a frequency-hopping range to which the target multicarrier symbol belongs refers to an order or index of a Hop to which the target multicarrier symbol belongs in time domain.

In one embodiment, the statement that "a frequency-hopping range to which the target multicarrier symbol belongs is used to determine the target parameter out of the X3 candidate parameters" in the claims includes the meaning that: the frequency-hopping range to which the target multicarrier symbol belongs is used by the first node or the second node in the present application to determine the target parameter out of the X3 candidate parameters.

In one embodiment, the statement that "a frequency-hopping range to which the target multicarrier symbol belongs is used to determine the target parameter out of the X3 candidate parameters" in the claims includes the meaning that: the frequency-hopping range to which the target multicarrier symbol belongs determines the target parameter out of the X3 candidate parameters according to a pre-defined mapping relation or correspondence relation.

In one embodiment, the statement that "a frequency-hopping range to which the target multicarrier symbol belongs is used to determine the target parameter out of the X3 candidate parameters" in the claims includes the meaning that: the frequency-hopping range to which the target multicarrier symbol belongs is one of X3 frequency-hopping ranges of the first PUCCH, and the X3 frequency-hopping ranges respectively correspond to the X3 candidate parameters, where the target parameter is one of the X3 candidate parameters that corresponds to the frequency-hopping range to which the target multicarrier symbol belongs.

In one embodiment, the statement that "a frequency-hopping range to which the target multicarrier symbol belongs is used to determine the target parameter out of the X3 candidate parameters" in the claims includes the meaning that: an order or index of the frequency-hopping range to which the target multicarrier symbol belongs is used to determine the target parameter out of the X3 candidate parameters.

In one embodiment, the statement that "a frequency-hopping range to which the target multicarrier symbol belongs is used to determine the target parameter out of the X3 candidate parameters" in the claims includes the meaning that: an order or index of the frequency-hopping range to which the target multicarrier symbol belongs is used to determine an index of the target parameter among the X3 candidate parameters.

In one embodiment, the statement that "a frequency-hopping range to which the target multicarrier symbol belongs is used to determine the target parameter out of the X3 candidate parameters" in the claims includes the meaning that: an index of the frequency-hopping range to which the target multicarrier symbol belongs is used to determine an index of the target parameter among the X3 candidate parameters according to pre-defined function.

In one embodiment, the statement that "a frequency-hopping range to which the target multicarrier symbol belongs is used to determine the target parameter out of the X3 candidate parameters" in the claims includes the meaning that: the frequency-hopping range to which the target multicarrier symbol belongs is in one of X3 frequency-hopping range groups, and any one of the X3 frequency-hopping range groups comprises a positive integer number of frequency-hopping range(s) of the first PUCCH, the X3 frequency-hopping range groups respectively corresponding to the X3 candidate parameters, where the target parameter is one of the X3 candidate parameters that corresponds to a frequency-hopping range group to which the frequency-hopping range to which the target multicarrier symbol belongs belongs. In one subsidiary embodiment of the above embodiment, any of the X3 frequency-hopping range groups comprises more than one frequency-hopping range of the first PUCCH. In one subsidiary embodiment of the above embodiment, any of the X3 frequency-hopping range groups comprises more than one frequency-hopping range of the first PUCCH consecutive in time domain. In one subsidiary embodiment of the above embodiment, the X3 frequency-hopping range groups comprise one frequency-hopping range group comprising more than one frequency-hopping range of the first PUCCH discrete in time domain.

In one embodiment, "a position of the target multicarrier symbol among the X1 multicarrier symbols" includes: a time-domain order of the target multicarrier symbol in the X1 multicarrier symbols.

In one embodiment, "a position of the target multicarrier symbol among the X1 multicarrier symbols" includes: an index of the target multicarrier symbol in the X1 multicarrier symbols.

In one embodiment, the X1 multicarrier symbols are indexed in an order from first to last, or reversely, where "a position of the target multicarrier symbol among the X1 multicarrier symbols" includes: an index of the target multicarrier symbol in the X1 multicarrier symbols.

In one embodiment, the statement in the claims that "a position of the target multicarrier symbol among the X1 multicarrier symbols is used to determine the target parameter out of the X3 candidate parameters" includes the following meaning: a position of the target multicarrier symbol among the X1 multicarrier symbols is used by the first node or the second node in the present application to determine the target parameter out of the X3 candidate parameters.

In one embodiment, the statement in the claims that "a position of the target multicarrier symbol among the X1 multicarrier symbols is used to determine the target parameter out of the X3 candidate parameters" includes the following meaning: an index of the target multicarrier symbol among the X1 multicarrier symbols is used to determine the target parameter out of the X3 candidate parameters according to a pre-defined mapping relation or correspondence relation.

In one embodiment, the statement in the claims that "a position of the target multicarrier symbol among the X1 multicarrier symbols is used to determine the target parameter out of the X3 candidate parameters" includes the following meaning: an index of the target multicarrier symbol among the X1 multicarrier symbols is used to determine an index of the target parameter among the X3 candidate parameters according to pre-defined function.

In one embodiment, the statement in the claims that "a position of the target multicarrier symbol among the X1 multicarrier symbols is used to determine the target parameter out of the X3 candidate parameters" includes the following meaning: the X1 multicarrier symbols are divided into X3 multicarrier symbol sets, and the X3 multicarrier symbol sets respectively correspond to the X3 candidate parameters, any of the X3 multicarrier symbol sets comprising a positive integer number of multicarrier symbol(s); the target multicarrier symbol belongs to a target multicarrier symbol set, the target multicarrier symbol set being one of the X3 multicarrier symbol sets; the target parameter is a candidate parameter among the X3 candidate parameters that corresponds to the target multicarrier symbol set.

In one embodiment, the statement in the claims that "a position of the target multicarrier symbol among the X1 multicarrier symbols is used to determine the target parameter out of the X3 candidate parameters" includes the following meaning: a remainder yielded by an index of the target multicarrier symbol among the X1 multicarrier symbols being divided by X3 is used to determine an index of the target parameter among the X3 candidate parameters.

In one embodiment, the statement in the claims that "a position of the target multicarrier symbol among the X1 multicarrier symbols is used to determine the target parameter out of the X3 candidate parameters" includes the following meaning: an index of the target parameter among the X3 candidate parameters is equal to a remainder yielded by an index of the target multicarrier symbol among the X1 multicarrier symbols being divided by X3.

Embodiment 9

Figure 9:
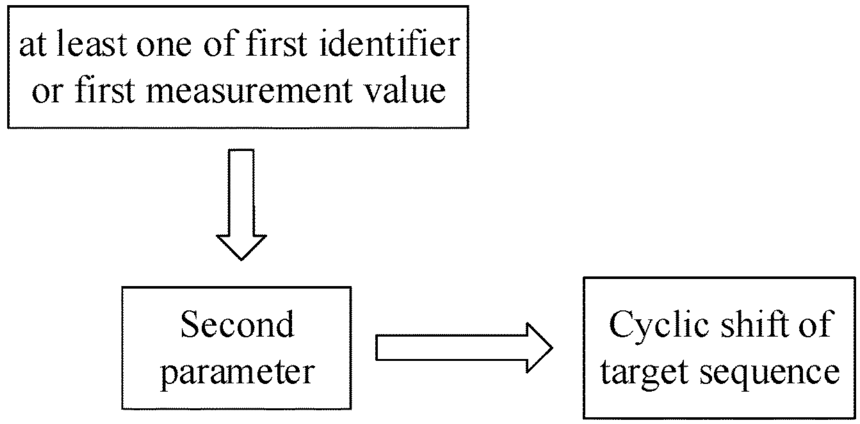
FIG. 9 illustrates a schematic diagram of a second parameter according to one embodiment of the present application.

Embodiment 9 illustrates a schematic diagram of a second parameter according to one embodiment of the present application, as shown in FIG. 9. In FIG. 9, each box represents an intermediate value or an intermediate variable, with an arrowhead indicating the relation between determining and being determined.

In Embodiment 9, a second parameter is used to determine a cyclic shift of the target sequence in the present application, the second parameter being a non-negative integer; at least one of a first identifier or a first measurement value is used to determine the second parameter, where the first identifier is an identifier that the first node in the present application is configured with, and the first measurement value is a measurement value obtained from a measurement by the first node.

In one embodiment, the second parameter is a non-negative integer less than the length of the first basic sequence.

In one embodiment, the second parameter is a positive integer.

In one embodiment, the second parameter is greater than or equal to the length of the first basic sequence.

In one embodiment, the second parameter is no greater than the length of the first basic sequence.

In one embodiment, the second parameter is $m_{cs}$.

In one embodiment, the second parameter is $m_0$.

In one embodiment, the second parameter is $m_{int}$.

In one embodiment, the second parameter is equal to one of W1 candidate parameter values, and any of the W1 candidate parameter values is equal to a non-negative integer, W1 being a positive integer greater than 1; the W1 candidate parameter values are sorted in an ascending order, where a difference between two adjacently arranged candidate parameter values among the W1 candidate parameter values is equal to a quotient of the length of the first basic sequence and the W1. In one subsidiary embodiment of the above embodiment, a smallest value among the W1 candidate parameter values is equal to an initial parameter value, where the initial parameter value is pre-defined, or is configurable. In one subsidiary embodiment of the above embodiment, a smallest value among the W1 candidate parameter values is equal to an initial parameter value, where the first information block in the present application is used for indicating the initial parameter value. In one subsidiary embodiment of the above embodiment, W1 is pre-defined, or W1 is configurable. In one subsidiary embodiment of the above embodiment, the first information block in the present application is used for indicating the W1. In one subsidiary embodiment of the above embodiment, an information block other than the first information block in the present application is used for indicating the W1.

In one embodiment, the statement in the claims that "a second parameter is used to determine a cyclic shift of the target sequence" includes a meaning that: the second parameter is used by the first node or the second node in the present application to determine a cyclic shift of the target sequence.

In one embodiment, the statement in the claims that "a second parameter is used to determine a cyclic shift of the target sequence" includes a meaning that: the second parameter is used for calculating a value of the cyclic shift of the target sequence.

In one embodiment, the statement in the claims that "a second parameter is used to determine a cyclic shift of the target sequence" includes a meaning that: a value of the cyclic shift of the target sequence is linear with the second parameter.

In one embodiment, the statement in the claims that "a second parameter is used to determine a cyclic shift of the target sequence" includes a meaning that: a value of the cyclic shift of the target sequence is linear with a second remainder, the second remainder being equal to a remainder yielded by the second parameter mod the length of the first basic sequence.

In one embodiment, the statement in the claims that "a second parameter is used to determine a cyclic shift of the target sequence" includes a meaning that: the second parameter is used to determine a value of the cyclic shift of the target sequence according to a pre-defined function relationship.

In one embodiment, the second parameter and the target parameter are mutually independent of each other.

In one embodiment, the second parameter is unrelated to the target parameter.

In one embodiment, the second parameter and the first parameter are independent.

In one embodiment, the second parameter is unrelated to the first parameter.

In one embodiment, the statement in the claims that "a second parameter is used to determine a cyclic shift of the target sequence" is implemented by means of:

$$\alpha_{target} = \frac{2\pi}{N_{seq}}((m_{target} + m_1 + m_2) \bmod N_{seq})$$

where $\alpha_{target}$ represents a value of the cyclic shift of the target sequence, $N_{seq}$ represents a length of the first basic sequence, $m_{target}$ represents the target parameter, $m_1$ represents the first parameter in the present application, and $m_2$ represents the second parameter in the present application.

In one embodiment, the first identifier is a Radio Network Temporary Identity (RNTI).

In one embodiment, the first identifier is a C-RNTI.

In one embodiment, the first identifier is a Configured Scheduling-Radio Network Temporary Identifier (CS-RNTI).

In one embodiment, the first identifier is a Group-Radio Network Temporary Identifier (G-RNTI).

In one embodiment, the first identifier is a Multicast (and Broadcast Services)-Radio Network Temporary Identifier (M-RNTI).

In one embodiment, the first identifier is a Single Cell-Radio Network Temporary Identifier (SC-RNTI).

In one embodiment, the first identifier is a Single Cell-Notification-Radio Network Temporary Identifier (SC-N-RNTI).

In one embodiment, the first identifier is one of a C-RNTI, a CS-RNTI, a G-RNTI, a M-RNTI, a SC-RNTI or a SC-N-RNTI.

In one embodiment, the first identifier is one of a C-RNTI or a G-RNTI.

In one embodiment, the first identifier is an index value.

In one embodiment, the first identifier is a non-negative integer.

In one embodiment, the first identifier is a positive integer.

In one embodiment, the first identifier is an integer.

In one embodiment, the first identifier is an integer on a decimal base.

In one embodiment, the first identifier is an integer on a hexadecimal base.

In one embodiment, the first identifier is configured by a transmitter of the first PDCCH.

In one embodiment, the first identifier is configured by a Radio Resource Control (RRC) signaling.

In one embodiment, the first identifier is configured by a Media Access Control (MAC) Control Element (CE).

In one embodiment, the first identifier is configured by a Multicell/Multicast Coordination Entity (MCE).

In one embodiment, the first identifier is an identifier of a UE group.

In one embodiment, a target receiver of the first PDCCH includes Q1 UEs, Q1 being a positive integer greater than 1, where the first node is one of the Q1 UEs. In one subsidiary embodiment of the above embodiment, the first identifier is used for identifying the Q1 UEs. In one subsidiary embodiment of the above embodiment, any of the Q1 UEs is configured with the first identifier.

In one embodiment, the first measurement value is a Synchronization Signal-Reference Signal Receiving Power (SS-RSRP).

In one embodiment, the first measurement value is a Synchronization Signal-Reference Signal Receiving Quality (SS-RSRQ).

In one embodiment, the first measurement value is a Channel Status Information-Reference Signal Receiving Power (CSI-RSRP).

In one embodiment, the first measurement value is a Channel Status Information-Reference Signal Receiving Quality (CSI-RSRQ).

In one embodiment, the first measurement value is a value of a Synchronization Signal-Signal to Interference plus Noise Ratio (SS-SINR) measured by the first node.

In one embodiment, the first measurement value is a value of a Synchronization Signal-Signal to Interference plus Noise Ratio (CSI-SINR).

In one embodiment, the first measurement value is a value of a Pathloss.

In one embodiment, the first measurement value is a value of a Channel Quality Indicator (CQI).

In one embodiment, the first measurement value is a value of a Layer 1 (L1) RSRP.

In one embodiment, the statement in the claims that "at least one of a first identifier or a first measurement value is used to determine the second parameter" includes the following meaning: at least one of the first identifier or the first measurement value is used by the first node in the present application to determine the second parameter.

In one embodiment, the statement in the claims that "at least one of a first identifier or a first measurement value is used to determine the second parameter" includes the following meaning: the first identifier and the first measurement value are used to determine the second parameter.

In one embodiment, the statement in the claims that "at least one of a first identifier or a first measurement value is used to determine the second parameter" includes the following meaning: one of the first identifier or the first measurement value is used to determine the second parameter.

In one embodiment, the statement in the claims that "at least one of a first identifier or a first measurement value is used to determine the second parameter" includes the following meaning: at least one of the first identifier or the first measurement value is used to determine the second parameter according to a pre-defined mapping relation or correspondence relation.

In one embodiment, the statement in the claims that "at least one of a first identifier or a first measurement value is used to determine the second parameter" includes the following meaning: at least one of the first identifier or the first measurement value is used to determine the second parameter according to a pre-defined function relation.

In one embodiment, the statement in the claims that "at least one of a first identifier or a first measurement value is used to determine the second parameter" includes the following meaning: at least one of a first identifier or a first measurement value is used to determine a value of the second parameter.

In one embodiment, the statement in the claims that "at least one of a first identifier or a first measurement value is used to determine the second parameter" includes the following meaning: the second parameter is equal to one of W1 candidate parameter values, and any of the W1 candidate parameter values is equal to a non-negative integer, W1 being a positive integer greater than 1; at least one of a first identifier or a first measurement value is used to determine the second parameter out of the W1 candidate parameter values.

In one subsidiary embodiment of the above embodiment, the W1 candidate parameter values are sorted in an ascending order, where a difference between two adjacently arranged candidate parameter values among the W1 candidate parameter values is equal to a quotient of the length of the first basic sequence and the W1.

In one subsidiary embodiment of the above embodiment, a smallest value among the W1 candidate parameter values is equal to an initial parameter value, where the initial parameter value is pre-defined, or is configurable.

In one subsidiary embodiment of the above embodiment, a smallest value among the W1 candidate parameter values is equal to an initial parameter value, where the first information block in the present application is used for indicating the initial parameter value.

In one subsidiary embodiment of the above embodiment, W1 is pre-defined, or W1 is configurable.

In one subsidiary embodiment of the above embodiment, the first information block in the present application is used for indicating the W1.

In one subsidiary embodiment of the above embodiment, an information block other than the first information block in the present application is used for indicating the W1.

In one subsidiary embodiment of the above embodiment, at least one of the first identifier or the first measurement value is used to determine an index of the second parameter in the W1 candidate parameter values.

In one subsidiary embodiment of the above embodiment, an index of the second parameter in the W1 candidate parameter values is equal to a remainder yielded by the first identifier divided by the W1.

In one subsidiary embodiment of the above embodiment, the first identifier is equal to one of W1 candidate identifiers, the W1 candidate identifiers respectively corresponding to the W1 candidate parameter values, where the second parameter is equal to one of the W1 candidate parameter values that corresponds to the first identifier; the one-to-one correspondence relationship between the W1 candidate identifiers and the W1 candidate parameter values is either pre-defined or configurable.

In one subsidiary embodiment of the above embodiment, the first measurement value belongs to one of W1 measurement ranges, and any of the W1 measurement ranges is a range of values for a measurement value; the W1 measurement ranges respectively correspond to the W1 candidate parameter values, where the second parameter is equal to a candidate parameter value corresponding to a measurement range to which the first measurement value belongs among the W1 candidate parameter values; the one-to-one correspondence relationship between the W1 measurement ranges and the W1 candidate parameter values is either pre-defined or configurable.

In one subsidiary embodiment of the above embodiment, the first measurement value belongs to a first measurement range, the first measurement range being a range of values for a measurement value; the first identifier and the first measurement range belong to one of W1 candidate combinations, any of the W1 candidate combinations comprising one identifier and one measurement range; the W1 candidate combinations respectively correspond to the W1 candidate parameter values, where the second parameter is equal to a candidate parameter value corresponding to a candidate combination that comprises the first identifier and the first measurement range among the W1 candidate parameter values; the one-to-one correspondence relationship between the W1 candidate combinations and the W1 candidate parameter values is either pre-defined or configurable.

In one embodiment, the first information block in the present application is used to determine the second parameter.

In one embodiment, an information block other than the first information block in the present application is used to determine the second parameter.

Embodiment 10

Figure 10:
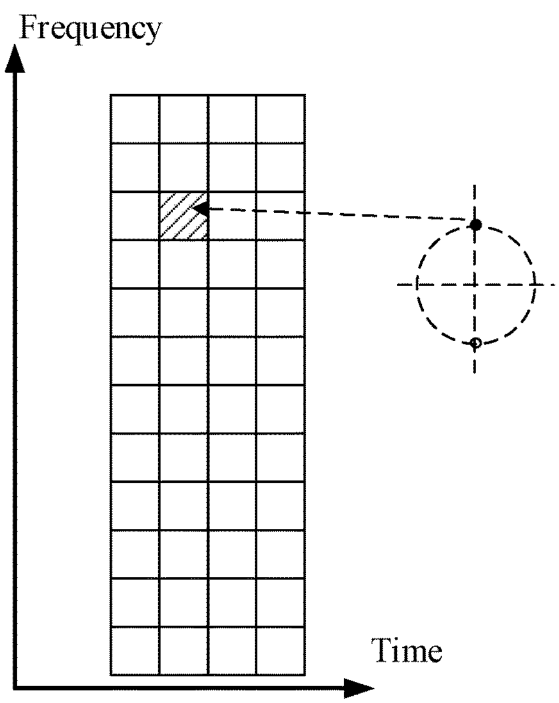
FIG. 10 illustrates a schematic diagram of a target modulation symbol according to one embodiment of the present application.

Embodiment 10 illustrates a schematic diagram of a target modulation symbol according to one embodiment of the present application, as shown in FIG. 10. In FIG. 10, the horizontal axis represents time, while the vertical axis represents frequency; each small rectangular box represents an RE occupied by a first PUCCH, of which the slash-filled rectangle represents a first RE; the broken-line circle represents the polar coordinate system, the solid black dot represents a target modulation symbol, and the hollow solid-line dot represents a modulation symbol of X4 modulation symbols other than the target modulation symbol.

In Embodiment 10, X4 modulation symbols are used for generating the first PUCCH in the present application, modulation schemes used by any two modulation symbols among the X4 modulation symbols are identical, and phases of any two modulation symbols among the X4 modulation symbols are different, where X4 is a positive integer greater than 1; a first RE is an RE occupied by the first PUCCH in the present application, and a target modulation symbol is used for generating a complex-valued symbol mapped onto the first RE, the target modulation symbol being one of the X4 modulation symbols, where a time-domain position of a multicarrier symbol occupied by the first RE in time domain is used to determine the target modulation symbol.

In one embodiment, a modulation scheme used by any one of the X4 modulation symbols is Binary Phase Shift Keying (BPSK).

In one embodiment, a modulation scheme used by any one of the X4 modulation symbols is Pi/2 BPSK.

In one embodiment, a modulation scheme used by any one of the X4 modulation symbols is Quadrature Phase Shift Keying (QPSK).

In one embodiment, a modulation scheme used by any one of the X4 modulation symbols is Pi/4 Quadrature Phase Shift Keying (QPSK).

In one embodiment, any two of the X4 modulation symbols have different constellation points.

In one embodiment, two complex numbers representing any two of the X4 modulation symbols have different constellation points have different phases in the polar coordinates.

In one embodiment, two complex numbers representing any two of the X4 modulation symbols are unequal.

In one embodiment, the statement in the claims that "X4 modulation symbols are used for generating the first PUCCH" includes the following meaning: the X4 modulation symbols are used together with the X2 sequences for generating the first PUCCH.

In one embodiment, the statement in the claims that "X4 modulation symbols are used for generating the first PUCCH" includes the following meaning: the X4 modulation symbols are used by the first node in the present application for generating the first PUCCH.

In one embodiment, the statement in the claims that "X4 modulation symbols are used for generating the first PUCCH" includes the following meaning: the X2 sequences after being through sequence modulation performed by the X4 modulation symbols are used for generating the first PUCCH.

In one embodiment, the statement in the claims that "X4 modulation symbols are used for generating the first PUCCH" includes the following meaning: the X4 modulation symbols are used together with all elements comprised by the X2 sequences for generating Complex-valued symbols mapped onto RE(s) occupied by the first PUCCH, which are then through OFDM Baseband Signal Generation and Modulation and Upconversion for obtaining the first PUCCH.

In one embodiment, the statement in the claims that "X4 modulation symbols are used for generating the first PUCCH" includes the following meaning: the X4 modulation symbols are used together with all elements comprised by the X2 sequences for generating Complex-valued symbols mapped onto RE(s) occupied by the first PUCCH, which are then through OFDM Baseband Signal Generation for obtaining the first PUCCH.

In one embodiment, the statement in the claims that "X4 modulation symbols are used for generating the first PUCCH" includes the following meaning: a complex-valued symbol mapped onto any RE occupied by the first PUCCH is obtained by one of the X4 modulation symbols multiplied by element(s) comprised by one of the X2 sequences through Block-wise spread and Amplitude Scaling.

In one embodiment, X4 is equal to 2.

In one embodiment, X4 is equal to 4.

In one embodiment, X4 is greater than 4.

In one embodiment, the first RE is any RE among all REs occupied by the first PUCCH.

In one embodiment, a multicarrier symbol occupied by the first RE in time domain is a starting multicarrier symbol of the X1 multicarrier symbols.

In one embodiment, a multicarrier symbol occupied by the first RE in time domain is a multicarrier symbol other than a starting multicarrier symbol among the X1 multicarrier symbols.

In one embodiment, the first RE is an RE comprised by the target RE set.

In one embodiment, the first RE is an RE other than any RE comprised by the target RE set.

In one embodiment, a multicarrier symbol occupied by the first RE in time domain is the target multicarrier symbol.

In one embodiment, a multicarrier symbol occupied by the first RE in time domain is a multicarrier symbol other than the target multicarrier symbol.

In one embodiment, a complex-valued symbol mapped to the first RE is a complex-valued symbol comprised in a complex valued sequence before mapping to physical resources.

In one embodiment, a complex-valued symbol mapped to the first RE is a complex-valued symbol comprised in a complex valued sequence in an input to mapping to physical resources.

In one embodiment, a complex-valued symbol mapped to the first RE is a complex-valued symbol comprised in a complex valued sequence being mapped to physical resources.

In one embodiment, a complex-valued symbol mapped to the first RE is a complex-valued symbol obtained by Amplitude Scaling of a complex valued sequence before mapping to physical resources.

In one embodiment, a complex-valued symbol mapped to the first RE is a complex-valued symbol obtained by Amplitude Scaling of a complex valued sequence in an input to mapping to physical resources.

In one embodiment, a complex-valued symbol mapped to the first RE is a complex-valued symbol having been through Amplitude Scaling.

In one embodiment, a complex-valued symbol mapped to the first RE is a complex-valued symbol before being through Amplitude Scaling.

In one embodiment, the statement in the claims that "a target modulation symbol is used for generating a complex-valued symbol mapped onto the first RE" includes the following meaning: the target modulation symbol is used by the first node in the present application for generating a complex-valued symbol mapped onto the first RE.

In one embodiment, the statement in the claims that "a target modulation symbol is used for generating a complex-valued symbol mapped onto the first RE" includes the following meaning: the target modulation symbol is used together with one element in a sequence of the X2 sequences for generating a complex-valued symbol mapped onto the first RE.

In one embodiment, the statement in the claims that "a target modulation symbol is used for generating a complex-valued symbol mapped onto the first RE" includes the following meaning: the target modulation symbol is used for Sequence Modulation of a sequence of the X2 sequences, through which a complex-valued symbol mapped onto the first RE is obtained.

In one embodiment, the statement in the claims that "a target modulation symbol is used for generating a complex-valued symbol mapped onto the first RE" includes the following meaning: the target modulation symbol is used for Sequence Modulation of a sequence of the X2 sequences, which is then through Block-wise spread for obtaining a complex-valued symbol mapped onto the first RE set.

In one embodiment, the statement in the claims that "a target modulation symbol is used for generating a complex-valued symbol mapped onto the first RE" includes the following meaning: a complex-valued symbol obtained by the target modulation symbol used for Sequence Modulation of a sequence of the X2 sequences, after being through Amplitude Scaling, is mapped onto the first RE.

In one embodiment, the statement in the claims that "a target modulation symbol is used for generating a complex-valued symbol mapped onto the first RE" includes the following meaning: a complex-valued symbol obtained by the target modulation symbol being used for Sequence Modulation of a sequence of the X2 sequences and then through Block-wise spread, after being through Amplitude Scaling, is mapped onto the first RE.

In one embodiment, the statement that "a time-domain position of multicarrier symbol(s) occupied by the first RE in time domain is used to determine the target modulation symbol" in the claims includes the meaning that: the time-domain position of multicarrier symbol(s) occupied by the first RE in time domain is used by the first node in the present application to determine the target modulation symbol.

In one embodiment, the statement that "a time-domain position of multicarrier symbol(s) occupied by the first RE in time domain is used to determine the target modulation symbol" in the claims includes the meaning that: the time-domain position of multicarrier symbol(s) occupied by the first RE in time domain is used for determining the target modulation symbol out of the X4 modulation symbols.

In one embodiment, the statement that "a time-domain position of multicarrier symbol(s) occupied by the first RE in time domain is used to determine the target modulation symbol" in the claims includes the meaning that: the time-domain position of multicarrier symbol(s) occupied by the first RE in time domain is used for determining a phase of the target modulation symbol.

In one embodiment, the statement that "a time-domain position of multicarrier symbol(s) occupied by the first RE in time domain is used to determine the target modulation symbol" in the claims includes the meaning that: the time-domain position of multicarrier symbol(s) occupied by the first RE in time domain is used for determining a phase of a complex number that represents the target modulation symbol in the polar coordinates.

In one embodiment, the statement that "a time-domain position of multicarrier symbol(s) occupied by the first RE in time domain is used to determine the target modulation symbol" in the claims includes the meaning that: an order or index of multicarrier symbol(s) occupied by the first RE in time domain is used for determining the target modulation symbol.

In one embodiment, the statement that "a time-domain position of multicarrier symbol(s) occupied by the first RE in time domain is used to determine the target modulation symbol" in the claims includes the meaning that: an order or an index of multicarrier symbol(s) occupied by the first RE in time domain in a slot it belongs to is used to determine the target modulation symbol.

In one embodiment, the statement that "a time-domain position of multicarrier symbol(s) occupied by the first RE in time domain is used to determine the target modulation symbol" in the claims includes the meaning that: an order or an index of multicarrier symbol(s) occupied by the first RE in time domain in the X1 multicarrier symbols to is used to determine the target modulation symbol.

In one embodiment, the statement that "a time-domain position of multicarrier symbol(s) occupied by the first RE in time domain is used to determine the target modulation symbol" in the claims includes the meaning that: an order or an index of multicarrier symbol(s) occupied by the first RE in time domain is used to determine the target modulation symbol according to a mapping relation or corresponding relation or a function relation which is pre-defined.

In one embodiment, the statement that "a time-domain position of multicarrier symbol(s) occupied by the first RE in time domain is used to determine the target modulation symbol" in the claims includes the meaning that: multicarrier symbol(s) occupied by the first RE in time domain belongs/belong to a first multicarrier symbol group, the first multicarrier symbol group is one of X4 multicarrier symbol groups, and any one of the X4 multicarrier symbol groups comprises a positive integer number of multicarrier symbol (s); the X4 multicarrier symbol groups respectively correspond to the X4 modulation symbols, and the target modulation symbol is one of the X4 modulation symbols corresponding to the first multicarrier symbol group. In one subsidiary embodiment of the above embodiment, any of the X4 multicarrier symbol groups comprises more than one multicarrier symbol. In one subsidiary embodiment of the above embodiment, there is one multicarrier symbol group among the X4 multicarrier symbol groups that only comprises one multicarrier symbol. In one subsidiary embodiment of the above embodiment, any of the X4 multicarrier symbol groups comprises multiple time-domain consecutive multicarrier symbols. In one subsidiary embodiment of the above embodiment, there is one multicarrier symbol group among the X4 multicarrier symbol groups that comprise multiple time-domain discrete multicarrier symbols.

In one embodiment, the statement that "a time-domain position of multicarrier symbol(s) occupied by the first RE in time domain is used to determine the target modulation symbol" in the claims includes the meaning that: a frequency-hopping range to which multicarrier symbol(s) occupied by the first RE in time domain belongs/belong is used to determine the target modulation symbol. In one subsidiary embodiment of the above embodiment, an order or index of a frequency-hopping range to which multicarrier symbol(s) occupied by the first RE in time domain belongs/belong is used to determine the target modulation symbol according to a pre-defined mapping relation or correspondence relation. In one subsidiary embodiment of the above embodiment, a frequency-hopping range to which multicarrier symbol(s) occupied by the first RE in time domain belongs/belong is one of X4 frequency-hopping ranges, the X4 frequency-hopping ranges respectively corresponding to the X4 modulation symbols, where the target modulation symbol is a modulation symbol among the X4 modulation symbols that corresponds to the frequency-hopping range to which multicarrier symbol(s) occupied by the first RE in time domain belongs/belong.

Embodiment 11

Figure 11:
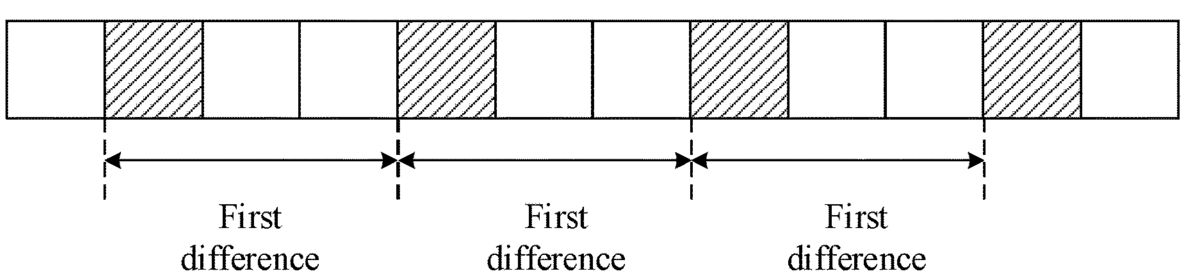
FIG. 11 illustrates a schematic diagram of a first difference according to one embodiment of the present application.

Embodiment 11 illustrates a schematic diagram of a first difference according to one embodiment of the present application, as shown in FIG. 11. In FIG. 11, each small box represents a minimum granularity that is allowed to be configured for each of X3 candidate parameters, and each box filled with oblique lines represents one of the X3 candidate parameters.

In Embodiment 11, the X3 candidate parameters in the present application are sorted in an ascending order, and a difference between any two adjacent candidate parameters among the X3 candidate parameters is equal to a first difference, where a length of the first basic sequence in the present application is used together with X3 to determine the first difference.

In one embodiment, the first difference is greater than 0.

In one embodiment, the first difference is a positive integer.

In one embodiment, the first difference is a positive integer greater than 1.

In one embodiment, the first difference is a positive integer greater than 1, and the first difference is divisible by the length of the first basic sequence with no remainder.

In one embodiment, the first difference is equal to one of 1, 2, 3, 4 or 6.

In one embodiment, the first difference is equal to an absolute value of a difference between any two adjacent candidate parameters among the X3 candidate parameters.

In one embodiment, a smallest candidate parameter among the X3 candidate parameters being added to the length of the first basic sequence and then being subtracted by a largest candidate parameter among the X3 candidate parameters is equal to the first difference.

In one embodiment, the statement that "a length of the first basic sequence is used together with X3 to determine the first difference" in the claims includes the following meaning: the length of the first basic sequence and the X3 are used together by the first node or the second node in the present application to determine the first difference.

In one embodiment, the statement that "a length of the first basic sequence is used together with X3 to determine the first difference" in the claims includes the following meaning: the length of the first basic sequence and the X3 are used together to calculate the first difference.

In one embodiment, the statement that "a length of the first basic sequence is used together with X3 to determine the first difference" in the claims includes the following meaning: a quotient of the length of the first basic sequence and the X3 is equal to the first difference.

In one embodiment, the statement that "a length of the first basic sequence is used together with X3 to determine the first difference" in the claims includes the following meaning: a remainder yielded by the length of the first basic sequence divided by the X3 is equal to the first difference.

In one embodiment, the statement that "a length of the first basic sequence is used together with X3 to determine the first difference" in the claims includes the following meaning: a nearest integer obtained by rounding down a quotient of the length of the first basic sequence and the X3 is equal to the first difference.

In one embodiment, the statement that "a length of the first basic sequence is used together with X3 to determine the first difference" in the claims includes the following meaning: the first difference is proportional to the length of the first basic sequence, and is inversely proportional to the X3.

Embodiment 12

Figure 12:
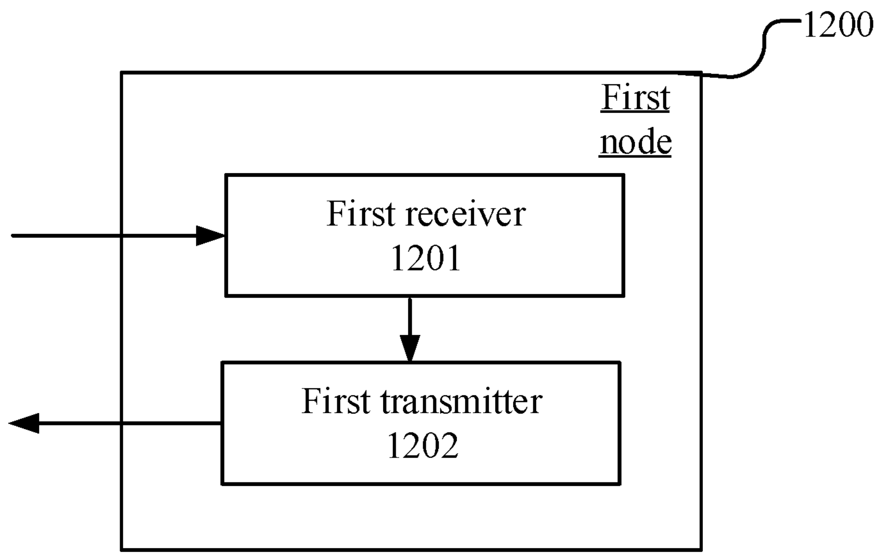
FIG. 12 illustrates a structure block diagram of a processing device in a first node according to one embodiment of the present application.

Embodiment 12 illustrates a structure block diagram of a processing device in a first node in an example, as shown in FIG. 12. In FIG. 12, a processing device 1200 in a first node is comprised of a first receiver 1201 and a first transmitter 1202. The first receiver 1201 comprises the transmitter/receiver 456 (comprising the antenna 460), the receiving processor 452 and the controller/processor 490 in FIG. 4 of the present application; the first transmitter 1202 comprises the transmitter/receiver 456 (comprising the antenna 460) and the transmitting processor 455 in FIG. 4 of the present application.

In Embodiment 12, the first receiver 1201 receives a first PDCCH, and the first transmitter 1202 transmits a first PUCCH, the first PUCCH occupying X1 multicarrier symbols in time domain, while the first PDCCH being used to determine a starting multicarrier symbol among the X1 multicarrier symbols, where X1 is a positive integer greater than 1; herein, a first basic sequence is used for generating the first PUCCH, and X2 sequences are generated by the first basic sequence through cyclic shifts, any two sequences among the X2 sequences are different, where X2 is a positive integer greater than 1; a target multicarrier symbol is one of the X1 multicarrier symbols, and a target Resource Element (RE) set comprises multiple REs occupied by the first PUCCH, any RE comprised by the target RE set occupying the target multicarrier symbol in time domain; a target sequence is one of the X2 sequences, and a target parameter is used to determine a cyclic shift of the target sequence, the target sequence being used for generating a complex-valued symbol mapped onto the target RE set; the target parameter is one of X3 candidate parameters, and any candidate parameter among the X3 candidate parameters is a non-negative integer smaller than a length of the first basic sequence, X3 being a positive integer greater than 1; there are two candidate parameters among the X3 candidate parameters between which a difference is no smaller than half the length of the first basic sequence, and any candidate parameter among the X3 candidate parameters is used to determine a cyclic shift of at least one sequence among the X2 sequences; a time-domain position of the target multicarrier symbol is used to determine the target parameter out of the X3 candidate parameters.

In one embodiment, the first receiver 1201 receives a first PDSCH; herein, the first PDSCH carries a first bit block, the first bit block comprising at least one bit, the first PUCCH being used to indicate that the first bit block is incorrectly decoded.

In one embodiment, a first parameter is used to determine a cyclic shift of the target sequence, and a pseudo-random sequence is used to determine the first parameter, the first parameter being a non-negative integer; a target identifier is used to determine an initial value of a generator of the pseudo-random sequence; the target identifier is configurable, or the target identifier is pre-defined.

In one embodiment, the first receiver 1201 receives a first information block; herein, the first information block is used to determine the X1 multicarrier symbols, and the first information block is used to determine whether the first PUCCH uses frequency hopping; when the first PUCCH uses frequency hopping, a frequency-hopping range to which the target multicarrier symbol belongs is used to determine the target parameter out of the X3 candidate parameters; otherwise, a position of the target multicarrier symbol among the X1 multicarrier symbols is used to determine the target parameter out of the X3 candidate parameters.

In one embodiment, a second parameter is used to determine a cyclic shift of the target sequence, the second parameter being a non-negative integer; at least one of a first identifier or a first measurement value is used to determine the second parameter, where the first identifier is an identifier that the first node is configured with, and the first measurement value is a measurement value obtained from a measurement by the first node.

In one embodiment, X4 modulation symbols are used for generating the first PUCCH, modulation schemes used by any two modulation symbols among the X4 modulation symbols are identical, and phases of any two modulation symbols among the X4 modulation symbols are different, where X4 is a positive integer greater than 1; a first Resource Element (RE) is an RE occupied by the first PUCCH, and a target modulation symbol is used for generating a complex-valued symbol mapped onto the first RE, the target modulation symbol being one of the X4 modulation symbols, where a time-domain position of a multicarrier symbol occupied by the first RE in time domain is used to determine the target modulation symbol.

In one embodiment, the X3 candidate parameters are sorted in an ascending order, and a difference between any two adjacent candidate parameters among the X3 candidate parameters is equal to a first difference, where a length of the first basic sequence is used together with X3 to determine the first difference.

Embodiment 13

Figure 13:
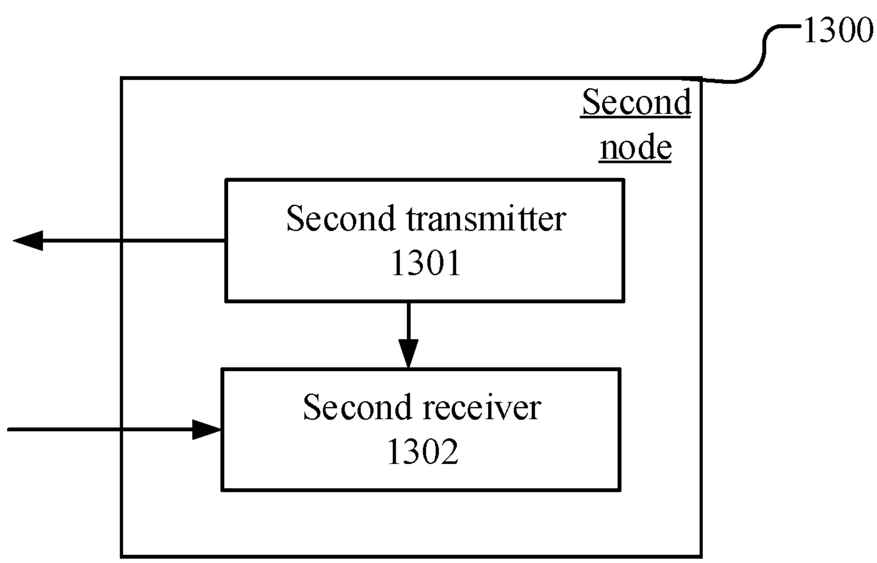
FIG. 13 illustrates a structure block diagram a processing device in a second node according to one embodiment of the present application.

Embodiment 13 illustrates a structure block diagram of a processing device in a second node in an example, as shown in FIG. 13. In FIG. 13, a processing device 1300 in a second node is comprised of a second transmitter 1301 and a second receiver 1302. The second transmitter 1301 comprises the transmitter/receiver 416 (comprising the antenna 460), the transmitting processor 415 and the controller/processor 440 in FIG. 4 of the present application; the second receiver 1302 comprises the transmitter/receiver 416 (comprising the antenna 460) and the receiving processor 412 in FIG. 4 of the present application.

In Embodiment 13, the second transmitter 1301 transmits a first PUCCH, the first PUCCH occupying X1 multicarrier symbols in time domain, and the first PDCCH being used to indicate a starting multicarrier symbol among the X1 multicarrier symbols, where X1 is a positive integer greater than 1; herein, a first basic sequence is used for generating the first PUCCH, and X2 sequences are generated by the first basic sequence through cyclic shifts, any two sequences among the X2 sequences are different, where X2 is a positive integer greater than 1; a target multicarrier symbol is one of the X1 multicarrier symbols, and a target Resource Element (RE) set comprises multiple REs occupied by the first PUCCH, any RE comprised by the target RE set occupying the target multicarrier symbol in time domain; a target sequence is one of the X2 sequences, and a target parameter is used to determine a cyclic shift of the target sequence, the target sequence being used for generating a complex-valued symbol mapped onto the target RE set; the target parameter is one of X3 candidate parameters, and any candidate parameter among the X3 candidate parameters is a non-negative integer smaller than a length of the first basic sequence, X3 being a positive integer greater than 1; there are two candidate parameters among the X3 candidate parameters between which a difference is no smaller than half the length of the first basic sequence, and any candidate parameter among the X3 candidate parameters is used to determine a cyclic shift of at least one sequence among the X2 sequences; a time-domain position of the target multicarrier symbol is used to determine the target parameter out of the X3 candidate parameters.

In one embodiment, the second transmitter 1301 transmits a first PDSCH; herein, the first PDSCH carries a first bit block, the first bit block comprising at least one bit, the first PUCCH being used to indicate that the first bit block is incorrectly decoded.

In one embodiment, a first parameter is used to determine a cyclic shift of the target sequence, and a pseudo-random sequence is used to determine the first parameter, the first parameter being a non-negative integer; a target identifier is used to determine an initial value of a generator of the pseudo-random sequence; the target identifier is configurable, or the target identifier is pre-defined.

In one embodiment, the second transmitter 1301 transmits a first information block; herein, the first information block is used to indicate the X1 multicarrier symbols, and the first information block is used to indicate whether the first PUCCH uses frequency hopping; when the first PUCCH uses frequency hopping, a frequency-hopping range to which the target multicarrier symbol belongs is used to determine the target parameter out of the X3 candidate parameters; otherwise, a position of the target multicarrier symbol among the X1 multicarrier symbols is used to determine the target parameter out of the X3 candidate parameters.

In one embodiment, a second parameter is used to determine a cyclic shift of the target sequence, the second parameter being a non-negative integer; at least one of a first identifier or a first measurement value is used to determine the second parameter, where the first identifier is an identifier that a transmitter of the first PUCCH is configured with, and the first measurement value is a measurement value obtained from a measurement by the transmitter of the first PUCCH.

In one embodiment, X4 modulation symbols are used for generating the first PUCCH, modulation schemes used by any two modulation symbols among the X4 modulation symbols are identical, and phases of any two modulation symbols among the X4 modulation symbols are different, where X4 is a positive integer greater than 1; a first Resource Element (RE) is an RE occupied by the first PUCCH, and a target modulation symbol is used for generating a complex-valued symbol mapped onto the first RE, the target modulation symbol being one of the X4 modulation symbols, where a time-domain position of a multicarrier symbol occupied by the first RE in time domain is used to determine the target modulation symbol.

In one embodiment, the X3 candidate parameters are sorted in an ascending order, and a difference between any two adjacent candidate parameters among the X3 candidate parameters is equal to a first difference, where a length of the first basic sequence is used together with X3 to determine the first difference.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present application is not limited to any combination of hardware and software in specific forms. The first node or the second node, or UE or terminal includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts, test equipment or test instrument, and other radio communication equipment, etc. The base station in the present application includes but is not limited to macro-cellular base stations, micro-cellular base stations, home base stations, relay base station, eNB, gNB, Transmitter Receiver Point (TRP), relay satellite, satellite base station, airborne base station, test apparatus, test equipment or test instrument, and other radio communication equipment.

The above are merely the preferred embodiments of the present application and are not intended to limit the scope of protection of the present application. Any modification, equivalent substitute and improvement made within the spirit and principle of the present application are intended to be included within the scope of protection of the present application.

What is claimed is:

1. A first node for wireless communications, comprising:

a first receiver, receiving a first PDCCH; and a first transmitter, transmitting a first PUCCH, the first PUCCH only carries Negative Acknowledgement (NACK), the first PUCCH occupying X1 multicarrier symbols in time domain, and the first PDCCH being used to determine a starting multicarrier symbol among the X1 multicarrier symbols, where X1 is a positive integer greater than 1;

wherein a first basic sequence is used for generating the first PUCCH, and X2 sequences are generated by the first basic sequence through cyclic shifts, any two sequences among the X2 sequences are different, where X2 is a positive integer greater than 1; a target multicarrier symbol is one of the X1 multicarrier symbols, and a target Resource Element (RE) set comprises multiple REs occupied by the first PUCCH, any RE comprised by the target RE set occupying the target multicarrier symbol in time domain; a target sequence is one of the X2 sequences, and a target parameter is used to determine a cyclic shift of the target sequence, the target sequence being used for generating a complex-valued symbol mapped onto the target RE set; the target parameter is one of X3 candidate parameters, and any candidate parameter among the X3 candidate parameters is a non-negative integer smaller than a length of the first basic sequence, X3 being a positive integer greater than 1; there are two candidate parameters among the X3 candidate parameters between which a difference is no smaller than half the length of the first basic sequence, and any candidate parameter among the X3 candidate parameters is used to determine a cyclic shift of at least one sequence among the X2 sequences; a time-domain position of the target multicarrier symbol is used to determine the target parameter out of the X3 candidate parameters.

2. The first node according to claim 1, characterized in that the first receiver receives a first PDSCH; wherein the first PDSCH carries a first bit block, the first bit block comprising at least one bit, the first PUCCH being used to indicate that the first bit block is incorrectly decoded.

3. The first node according to claim 1, characterized in that a first parameter is used to determine a cyclic shift of the target sequence, and a pseudo-random sequence is used to determine the first parameter, the first parameter being a non-negative integer; a target identifier is used to determine an initial value of a generator of the pseudo-random sequence; the target identifier is configurable, or the target identifier is pre-defined.

4. The first node according to claim 1, characterized in that the first receiver receives a first information block; wherein the first information block is used to determine the X1 multicarrier symbols, and the first information block is used to determine whether the first PUCCH uses frequency hopping; when the first PUCCH uses frequency hopping, a frequency-hopping range to which the target multicarrier symbol belongs is used to determine the target parameter out of the X3 candidate parameters; otherwise, a position of the target multicarrier symbol among the X1 multicarrier symbols is used to determine the target parameter out of the X3 candidate parameters.

5. The first node according to claim 1, characterized in that a second parameter is used to determine a cyclic shift of the target sequence, the second parameter being a non-negative integer; at least one of a first identifier or a first measurement value is used to determine the second parameter, where the first identifier is an identifier that the first node is configured with, and the first measurement value is a measurement value obtained from a measurement by the first node.

6. The first node according to claim 1, characterized in that X4 modulation symbols are used for generating the first PUCCH, modulation schemes used by any two modulation symbols among the X4 modulation symbols are identical, and phases of any two modulation symbols among the X4 modulation symbols are different, where X4 is a positive integer greater than 1; a first Resource Element (RE) is an RE occupied by the first PUCCH, and a target modulation symbol is used for generating a complex-valued symbol mapped onto the first RE, the target modulation symbol being one of the X4 modulation symbols, where a time-domain position of a multicarrier symbol occupied by the first RE in time domain is used to determine the target modulation symbol.

7. The first node according to claim 1, characterized in that the X3 candidate parameters are sorted in an ascending order, and a difference between any two adjacent candidate parameters among the X3 candidate parameters is equal to a first difference, where a length of the first basic sequence is used together with X3 to determine the first difference.

8. A second node for wireless communications, comprising:

a second transmitter, transmitting a first PDCCH; and a second receiver, receiving a first PUCCH, the first PUCCH only carries Negative Acknowledgement (NACK), the first PUCCH occupying X1 multicarrier symbols in time domain, and the first PDCCH being used to indicate a starting multicarrier symbol among the X1 multicarrier symbols, where X1 is a positive integer greater than 1;

wherein a first basic sequence is used for generating the first PUCCH, and X2 sequences are generated by the first basic sequence through cyclic shifts, any two sequences among the X2 sequences are different, where X2 is a positive integer greater than 1; a target multicarrier symbol is one of the X1 multicarrier symbols, and a target Resource Element (RE) set comprises multiple REs occupied by the first PUCCH, any RE comprised by the target RE set occupying the target multicarrier symbol in time domain; a target sequence is one of the X2 sequences, and a target parameter is used to determine a cyclic shift of the target sequence, the target sequence being used for generating a complex-valued symbol mapped onto the target RE set; the target parameter is one of X3 candidate parameters, and any candidate parameter among the X3 candidate parameters is a non-negative integer smaller than a length of the first basic sequence, X3 being a positive integer greater than 1; there are two candidate parameters among the X3 candidate parameters between which a difference is no smaller than half the length of the first basic sequence, and any candidate parameter among the X3 candidate parameters is used to determine a cyclic shift of at least one sequence among the X2 sequences; a time-domain position of the target multicarrier symbol is used to determine the target parameter out of the X3 candidate parameters.

9. The second node according to claim 8, characterized in that the second transmitter transmits a first PDSCH; wherein the first PDSCH carries a first bit block, the first bit block comprising at least one bit, the first PUCCH being used to indicate that the first bit block is incorrectly decoded.

10. The second node according to claim 8, characterized in that a first parameter is used to determine a cyclic shift of the target sequence, and a pseudo-random sequence is used to determine the first parameter, the first parameter being a non-negative integer; a target identifier is used to determine an initial value of a generator of the pseudo-random sequence; the target identifier is configurable, or the target identifier is pre-defined.

11. The second node according to claim 8, characterized in that the second transmitter transmits a first information block; wherein the first information block is used to determine the X1 multicarrier symbols, and the first information block is used to determine whether the first PUCCH uses frequency hopping; when the first PUCCH uses frequency hopping, a frequency-hopping range to which the target multicarrier symbol belongs is used to determine the target parameter out of the X3 candidate parameters; otherwise, a position of the target multicarrier symbol among the X1 multicarrier symbols is used to determine the target parameter out of the X3 candidate parameters.

12. The second node according to claim 8, characterized in that a second parameter is used to determine a cyclic shift of the target sequence, the second parameter being a non-negative integer; at least one of a first identifier or a first measurement value is used to determine the second parameter, where the first identifier is an identifier that a transmitter of the first PUCCH is configured with, and the first measurement value is a measurement value obtained from a measurement by the transmitter of the first PUCCH.

13. The second node according to claim 8, characterized in that X4 modulation symbols are used for generating the first PUCCH, modulation schemes used by any two modulation symbols among the X4 modulation symbols are identical, and phases of any two modulation symbols among the X4 modulation symbols are different, where X4 is a positive integer greater than 1; a first Resource Element (RE) is an RE occupied by the first PUCCH, and a target modulation symbol is used for generating a complex-valued symbol mapped onto the first RE, the target modulation symbol being one of the X4 modulation symbols, where a time-domain position of a multicarrier symbol occupied by the first RE in time domain is used to determine the target modulation symbol.

14. A method in a first node for wireless communications, comprising:

receiving a first PDCCH; and transmitting a first PUCCH, the first PUCCH only carries Negative Acknowledgement (NACK), the first PUCCH occupying X1 multicarrier symbols in time domain, and the first PDCCH being used to determine a starting multicarrier symbol among the X1 multicarrier symbols, where X1 is a positive integer greater than 1;

wherein a first basic sequence is used for generating the first PUCCH, and X2 sequences are generated by the first basic sequence through cyclic shifts, any two sequences among the X2 sequences are different, where X2 is a positive integer greater than 1; a target multicarrier symbol is one of the X1 multicarrier symbols, and a target Resource Element (RE) set comprises multiple REs occupied by the first PUCCH, any RE comprised by the target RE set occupying the target multicarrier symbol in time domain; a target sequence is one of the X2 sequences, and a target parameter is used to determine a cyclic shift of the target sequence, the target sequence being used for generating a complex-valued symbol mapped onto the target RE set; the target parameter is one of X3 candidate parameters, and any candidate parameter among the X3 candidate parameters is a non-negative integer smaller than a length of the first basic sequence, X3 being a positive integer greater than 1; there are two candidate parameters among the X3 candidate parameters between which a difference is no smaller than half the length of the first basic sequence, and any candidate parameter among the X3 candidate parameters is used to determine a cyclic shift of at least one sequence among the X2 sequences; a time-domain position of the target multicarrier symbol is used to determine the target parameter out of the X3 candidate parameters.

15. The method in the first node according to claim 14, comprising:

receiving a first PDSCH;

wherein the first PDSCH carries a first bit block, the first bit block comprising at least one bit, the first PUCCH being used to indicate that the first bit block is incorrectly decoded.

16. The method in the first node according to claim 14, characterized in that a first parameter is used to determine a cyclic shift of the target sequence, and a pseudo-random sequence is used to determine the first parameter, the first parameter being a non-negative integer; a target identifier is used to determine an initial value of a generator of the pseudo-random sequence; the target identifier is configurable, or the target identifier is pre-defined.

17. The method in the first node according to claim 14, comprising:

receiving a first information block;

wherein the first information block is used to determine the X1 multicarrier symbols, and the first information block is used to determine whether the first PUCCH uses frequency hopping;

when the first PUCCH uses frequency hopping, a frequency-hopping range to which the target multicarrier symbol belongs is used to determine the target parameter out of the X3 candidate parameters; otherwise, a position of the target multicarrier symbol among the X1 multicarrier symbols is used to determine the target parameter out of the X3 candidate parameters.

18. The method in the first node according to claim 14, characterized in that a second parameter is used to determine a cyclic shift of the target sequence, the second parameter being a non-negative integer; at least one of a first identifier or a first measurement value is used to determine the second parameter, where the first identifier is an identifier that the first node is configured with, and the first measurement value is a measurement value obtained from a measurement by the first node.

19. The method in the first node according to claim 14, characterized in that X4 modulation symbols are used for generating the first PUCCH, modulation schemes used by any two modulation symbols among the X4 modulation symbols are identical, and phases of any two modulation symbols among the X4 modulation symbols are different, where X4 is a positive integer greater than 1; a first Resource Element (RE) is an RE occupied by the first PUCCH, and a target modulation symbol is used for generating a complex-valued symbol mapped onto the first RE, the target modulation symbol being one of the X4 modulation symbols, where a time-domain position of a multicarrier symbol occupied by the first RE in time domain is used to determine the target modulation symbol.

20. The method in the first node according to claim 14, characterized in that the X3 candidate parameters are sorted in an ascending order, and a difference between any two adjacent candidate parameters among the X3 candidate parameters is equal to a first difference, where a length of the first basic sequence is used together with X3 to determine the first difference.

* * * * *